(12) United States Patent
Wetherbee et al.

(10) Patent No.: US 11,686,756 B2
(45) Date of Patent: *Jun. 27, 2023

(54) KIVIAT TUBE BASED EMI FINGERPRINTING FOR COUNTERFEIT DEVICE DETECTION

(71) Applicant: ORACLE INTERNATIONAL CORPORATION, Redwood Shores, CA (US)

(72) Inventors: Edward R. Wetherbee, Omaha, NE (US); Rui Zhong, La Jolla, CA (US); Kenny C. Gross, Escondido, CA (US); Guang C. Wang, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/672,928

(22) Filed: Feb. 16, 2022

(65) Prior Publication Data

US 2022/0326292 A1 Oct. 13, 2022

Related U.S. Application Data

(63) Continuation of application No. 16/804,531, filed on Feb. 28, 2020, now Pat. No. 11,255,894.

(51) Int. Cl.
*G01R 31/00* (2006.01)
*G01R 29/08* (2006.01)
*G06F 21/44* (2013.01)

(52) U.S. Cl.
CPC ....... *G01R 31/002* (2013.01); *G01R 29/0814* (2013.01); *G01R 29/0878* (2013.01); *G06F 21/44* (2013.01)

(58) Field of Classification Search
CPC .............. G01R 31/002; G01R 29/0814; G01R 29/0878; G06F 21/44
(Continued)

(56) References Cited

U.S. PATENT DOCUMENTS 3,705,516 A 12/1972 Reis
5,684,718 A 11/1997 Jenkins et al.
(Continued)

FOREIGN PATENT DOCUMENTS

CN 107181543 A1 9/2017
CN 110941020 A1 3/2020
(Continued)

OTHER PUBLICATIONS

Wang, Ray C., et al. "Process fault detection using time-explicit Kiviat diagrams." AIChE Journal 61.12 (2015): 4277-4293. (Year: 2015).*

(Continued)

*Primary Examiner* — Christopher P McAndrew
(74) *Attorney, Agent, or Firm* — Kraguljac Law Group, LLC

(57) ABSTRACT

Detecting a counterfeit status of a target device by: selecting a set of frequencies that best reflect load dynamics or other information content of a reference device while undergoing a power test sequence; obtaining target electromagnetic interference (EMI) signals emitted by the target device while undergoing the same power test sequence; creating a sequence of target kiviat plots from the amplitude of the target EMI signals at each of the set of frequencies at observations over the power test sequence to form a target kiviat tube EMI fingerprint; comparing the target kiviat tube EMI fingerprint to a reference kiviat tube EMI fingerprint for the reference device undergoing the power test sequence to determine whether the target device and the reference (Continued)

device are of the same type; and generating a signal to indicate a counterfeit status based at least in part on the results of the comparison.

20 Claims, 7 Drawing Sheets

(58) Field of Classification Search
USPC .................................................... 324/612
See application file for complete search history.

(56) References Cited

U.S. PATENT DOCUMENTS

| | | |
|---|---|---|
| 7,020,802 B2 | 3/2006 | Gross et al. |
| 7,281,112 B1 | 10/2007 | Gross et al. |
| 7,613,576 B2 | 11/2009 | Gross et al. |
| 7,613,580 B2 | 11/2009 | Gross et al. |
| 7,702,485 B2 | 4/2010 | Gross et al. |
| 7,703,325 B2 | 4/2010 | Wu |
| 7,869,977 B2 | 1/2011 | Lewis et al. |
| 8,055,594 B2 | 11/2011 | Dhanekula et al. |
| 8,069,490 B2 | 11/2011 | Gross et al. |
| 8,200,991 B2 | 6/2012 | Vaidyanathan et al. |
| 8,275,738 B2 | 9/2012 | Gross et al. |
| 8,341,759 B2 | 12/2012 | Gross et al. |
| 8,457,913 B2 | 6/2013 | Zwinger et al. |
| 8,543,346 B2 | 9/2013 | Gross et al. |
| 9,933,338 B2 | 4/2018 | Noda et al. |
| 10,149,169 B1 | 12/2018 | Keller |
| 10,452,510 B2 | 10/2019 | Gross et al. |
| 10,496,084 B2 | 12/2019 | Li et al. |
| 11,055,396 B2 | 7/2021 | Gross et al. |
| 2008/0140362 A1 | 6/2008 | Gross et al. |
| 2008/0252309 A1 | 10/2008 | Gross et al. |
| 2008/0252441 A1 | 10/2008 | McElfresh et al. |
| 2008/0256398 A1 | 10/2008 | Gross et al. |
| 2009/0099830 A1* | 4/2009 | Gross ............... G01R 31/2813 703/14 |
| 2009/0125467 A1 | 5/2009 | Dhanekula et al. |
| 2009/0306920 A1 | 12/2009 | Zwinger et al. |
| 2010/0023282 A1 | 1/2010 | Lewis et al. |
| 2010/0033386 A1 | 2/2010 | Lewis et al. |
| 2010/0161525 A1 | 6/2010 | Gross et al. |
| 2010/0305892 A1 | 12/2010 | Gross et al. |
| 2010/0306165 A1 | 12/2010 | Gross et al. |
| 2012/0030775 A1 | 2/2012 | Gross et al. |
| 2012/0111115 A1 | 5/2012 | Ume et al. |
| 2013/0157683 A1 | 6/2013 | Lymberopoulos et al. |
| 2014/0354300 A1 | 12/2014 | Ramachandran et al. |
| 2015/0137830 A1 | 5/2015 | Keller, III et al. |
| 2016/0097833 A1 | 4/2016 | Han et al. |
| 2016/0098561 A1 | 4/2016 | Keller et al. |
| 2016/0258378 A1 | 9/2016 | Bizub et al. |
| 2017/0163669 A1 | 6/2017 | Brown et al. |
| 2017/0301207 A1 | 10/2017 | Davis et al. |
| 2018/0011130 A1 | 1/2018 | Aguayo Gonzalez et al. |
| 2018/0060203 A1 | 3/2018 | Gupta et al. |
| 2018/0276044 A1 | 9/2018 | Fong et al. |
| 2018/0349797 A1 | 12/2018 | Garvey et al. |
| 2019/0064034 A1 | 2/2019 | Fayfield et al. |
| 2019/0102718 A1 | 4/2019 | Agrawal |
| 2019/0163719 A1 | 5/2019 | Gross et al. |
| 2019/0196892 A1 | 6/2019 | Matei et al. |
| 2019/0197045 A1* | 6/2019 | Kraljevic ............... G06F 16/275 |
| 2019/0197145 A1 | 6/2019 | Gross et al. |
| 2019/0237997 A1 | 8/2019 | Tsujii et al. |
| 2019/0243799 A1 | 8/2019 | Gross et al. |
| 2019/0286725 A1* | 9/2019 | Gawlick ............... G06F 16/1744 |
| 2019/0378022 A1 | 12/2019 | Wang et al. |
| 2020/0144204 A1 | 5/2020 | Keller, III et al. |
| 2020/0191643 A1 | 6/2020 | Davis |
| 2020/0201950 A1 | 6/2020 | Wang et al. |
| 2020/0242471 A1 | 7/2020 | Busch |
| 2020/0387753 A1 | 12/2020 | Brill et al. |
| 2021/0081573 A1 | 3/2021 | Gross et al. |
| 2021/0158202 A1 | 5/2021 | Backlawski et al. |
| 2021/0174248 A1 | 6/2021 | Wetherbee et al. |
| 2023/0054215 A1 | 2/2023 | Mishima et al. |

FOREIGN PATENT DOCUMENTS

| | | |
|---|---|---|
| DE | 4447288 B4 | 7/1995 |
| DE | 60017609 T2 | 10/2005 |
| DE | 102018207176 A1 | 11/2019 |
| KR | 20210082971 A | 7/2021 |
| WO | 2017187333 A1 | 11/2017 |
| WO | 2020215116 A1 | 10/2020 |
| WO | 2021166128 A1 | 8/2021 |

OTHER PUBLICATIONS

Garcia-Martin Eva et al., "Estimation of Energy Consumption in Machine Learning," Journal of Parallel and Distributed Computing, Elsevier, Amsterdam, NL, vol. 134, Aug. 21, 2019 (Aug. 21, 2019), pp. 77-88.

Huang H, et al. "Electronic counterfeit detection based on the measurement of electromagnetic fingerprint", Microelectronics Reliability: An Internat . Journal & World Abstracting Service, vol. 55, No. 9, Jul. 9, 2015 (Jul. 9, 2015) pp. 2050-2054.

Bouali Fatma et al. "Visual mining of time series using a tubular visualization", Visual Computer, Springer, Berlin, DE, vol. 32, No. 1, Dec. 5, 2014 (Dec. 5, 2014), pp. 15-30.

Deepika et al. "Design & development of location identification using RFID with Wi-Fi positioning systems", 2017 Ninth Intl. Conference on Ubiquitous and Future Networks (ICUFN). IEEE, 2017) 6 pgs.

Gou, Yuhua, Implementation of 3d Kiviat Diagrams. (2008). (Year: 2008).

Abran et al.; Estimation Models Based on Functional Profiles. Intl. Workshop on Software Measurement—IWSM/MetriKon, Kronisburg (Germany), Shaker Verlag. 2004 (Year: 2004).

Wang, Ray C., et al., Process Fault Detection Using Time-Explicit Kiviat Diagrams. AlChE Journal 61.12 (2015): 4277-4293.

Whisnant et al; "Proactive Fault Monitoring in Enterprise Servers", 2005 IEEE International Multiconference in Computer Science & Computer Engineering, Las Vegas, NV, Jun. 27-30, 2005.

U.S. Nuclear Regulatory Commission: "Technical Review of On-Lin Monitoring Techniques for Performance Assessment vol. 1: State-of-the Art", XP055744715, Jan. 31, 2006, pp. 1-132.

Patent Cooperation Treaty (PCT) International Search Report and Written Opinion of the International Searching Authority in PCT International Application No. PCT/US2021/014106, International filing date Jan. 20, 2021 (Jan. 20, 2021), dated Apr. 26, 2021 (Apr. 26, 2021), 11 pgs.

Hoyer et al.; Spectral Decomposition and Reconstruction of Nuclear Plant Signals; pp. 1153-1158; published Jan. 1, 2005; downloaded on Jul. 14, 2021 from: https://support.sas.com/resources/papers/proceedings-archive/SUGI93/Sugi-93-193%20Hoyer%20Gross.pdf.

Michael Kan; Does Your Motherboard Have a Secret Chinese Spy Chip?; Oct. 5, 2018, pp. 1-9, downloaded on Sep. 3, 2021 from: https://www.pcmag.com/news/does-your-motherboard-have-a-secret-chinese-spy-chip.

Kenny Gross, Oracle Labs; MSET2 Overview: "Anomaly Detection and Prediction" Oracle Cloud Autonomous Prognostics; p. 1-58; Aug. 8, 2019.

Gribok, et al,. "Use of Kernel Based Techniques for Sensor Validation in Nuclear Power Plants," International Topical Meeting on Nuclear Plant Instrumentation, Controls, and Human-Machine Interface Technologies (NPIC & HMIT 2000), Washington, DC, Nov. 2000, pp. 1-15.

Gross, K. C. et al., "Application of a Model-Based Fault Detection System to Nuclear Plant Signals," downloaded from https://www.researchgate.net/publication/236463759; Conference Paper: May 1, 1997, 5 pages.

(56) References Cited

OTHER PUBLICATIONS

Singer, et al., "Model-Based Nuclear Power Plant Monitoring and Fault Detection: Theoretical Foundations," Intelligent System Application to Power Systems (ISAP '97), Jul. 6-10, 1997, Seoul, Korea pp. 60-65.
Dickey et al.; Checking for Autocorrelation in Regression Residuals; pp. 959-965; Proceedings of 11th Annual SAS Users Group International Conference; 1986.
Ray; Frequency Calibration for SDRs Without GPS, pp. 1-9, Feb. 15, 2018; downloaded from: https://www.amsat.org/wordpress/wp-content/uploads/2018/02/2017Symposium-SDR-Freq-Calibration.pdf.
United States Patent and Trademark Office, Non-Final Office Action issued in U.S. Appl. No. 16/820,807 dated May 21, 2021 (36 pgs).
Wikipedia; Polarizability; pp. 1-4; downloaded on Sep. 3, 2021 from: https://en.wikipedia.org/w/index.php?title=Polarizability&oldid=1024366656.
Patent Cooperation Treaty (PCT), International Search Report and Written Opinion issued in PCT International Application No. PCT/US2021/062380 dated May 24, 2022 (10 pgs).
Patent Cooperation Treaty (PCT), International Search Report and Written Opinion issued in PCT International Application No. PCT/US2020/060083 dated Mar. 19, 2021 (13 pgs).
Patent Cooperation Treaty (PCT), International Search Report and Written Opinion issued in PCT International Application No. PCT/US2021/015802 dated May 28, 2021 (13 pgs).
Patent Cooperation Treaty (PCT), International Search Report and Written Opinion issued in PCT International Application No. PCT/US2021/013633 dated May 6, 2021 (10 pgs).
Patent Cooperation Treaty (PCT), International Search Report and Written Opinion issued in PCT International Application No. PCT/US2021/015359 dated Apr. 9, 2021 (34 pgs).
Intellectual Property India, "Examination Report under Sections 12 & 13 of the Patents Act, 1970 and the Patent Rules 2003", issued in India Patent Application No. 202247032583 having a Date of Dispatch/ dated Oct. 19, 2022 (6 pgs).
Mishima et al., Abnormality Estimation Apparatus, Abnormality Estimation Method, and Computer-Readable Recording Medium, machine translation of WO 2021166128 A1.
Wang et al., Machine Condition Monitoring and Fault Prediction System, machine translation of DE 4447288 A1.
Im et al., Method and Apparatus for Performing Vibration Shake Test of Satellites, machine translation of KR 20210082971 A.
Diamond et al., A Method and System for Monitoring Rotor Blades of a Turbomachine Using Blade Tip Timing (Bl I), machine translation of WO 2017187333 A1.
Lafleur et al., Arrangement and Method for Vibration Testing with Acoustic Waves, machine translation of DE 30017609 T2.
Grasreiner et al., Method and Control Unit for Detecting Rough Running of a Drive, machine translation of De 102018207176A1.
Yesilli et al., On Transfer Learning for Chatter Detection in Turning Using Wavelet Packet Transform and Ensemble Empirical Mode Decomposition, CIRP Journal of Manufacturing Science and Technology 28 (2020) 118-135.

\* cited by examiner

KIVIAT TUBE BASED EMI FINGERPRINTING FOR COUNTERFEIT DEVICE DETECTION

CROSS REFERENCE TO RELATED APPLICATION

This disclosure is a continuation of and claims the benefit of priority to U.S. patent application Ser. No. 16/804,531, entitled "High Sensitivity Detection and Identification of Counterfeit Components in Utility Power Systems Via EMI Frequency Kiviat Tubes," filed Feb. 28, 2020, which is incorporated herein by reference in its entirety for all purposes.

BACKGROUND

It has been estimated that counterfeit electronic components in international supply chains cost $200 billion per year across all industries that use electronics (including the information technology, medical, military, gaming, transportation, and utility sectors). Counterfeit systems often appear so real that service engineers cannot distinguish them from authentic systems by simple visual inspection. However, the counterfeit systems often contain scrap components from discarded systems, cheaply manufactured components, or older components from recycled vintage systems, which are repackaged to resemble authentic systems.

Such systems are then integrated into the supply chain via brokerage channels. When the counterfeit systems are shipped to customers, they often fail on arrival or within a very short time period causing large warranty losses, shortened mean time between failures, and customer dissatisfaction. In some situations, the counterfeit systems even include "spy chips" or "mod chips" which can grant unauthorized access to or control over the counterfeit system, presenting a significant risk to infrastructure. In the utility sector, the use of counterfeit electronic components is more than a costly nuisance—it is a major safety concern. Failure of utility components can cause life-threatening situations such as blackouts and fires.

The North American Electric Reliability Corporation, (NERC, a North American utility regulator) and the United States Federal Energy Reliability Commission (FERC) have issued a supply chain risk management regulation (No. CIP-013-1) to reduce risks to the reliable operation of the bulk electrical system. The regulation requires that by July 2020 all utilities on the North American continent must implement technology to detect counterfeit components for all power system assets used in generating facilities, supervisory control and data acquisition (SCADA) subsystems, and distribution-grid assets.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements, or multiple elements may be implemented as one element. In some embodiments, an element shown as an internal component of another element may be implemented as an external component and vice versa. Furthermore, elements may not be drawn to scale.

DETAILED DESCRIPTION

Figure 1:
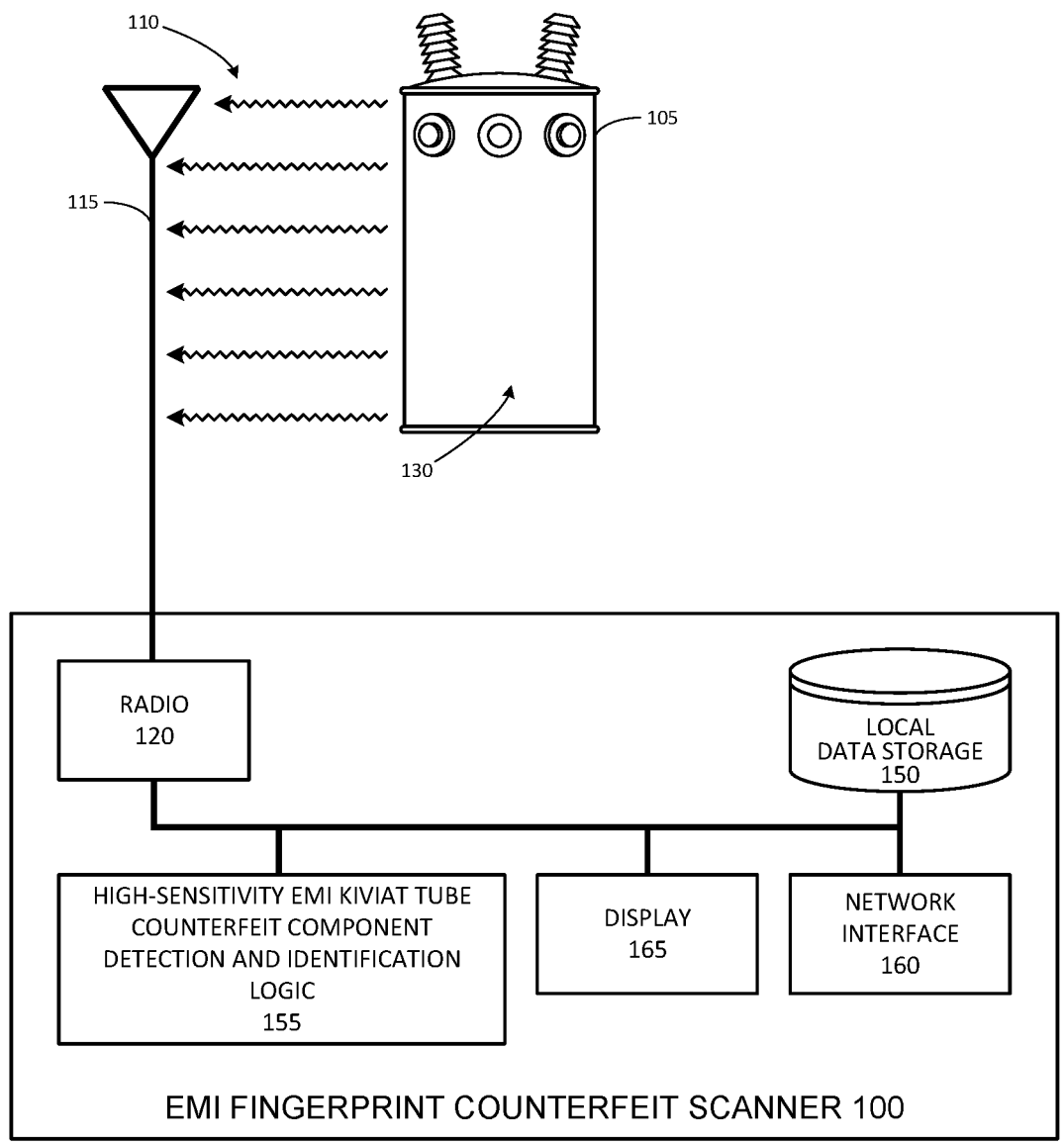
FIG. 1 illustrates one embodiment of an EMI fingerprint counterfeit scanner and an example target device associated with kiviat tube based EMI fingerprinting for counterfeit device detection.

Systems, methods, and other embodiments are described herein that provide high-sensitivity detection and identification of counterfeit components or devices through the application of electromagnetic interference (EMI) frequency kiviat tubes. These systems, methods, and other embodiments provide kiviat tube based EMI fingerprinting for counterfeit device detection.

EMI signals are generated during operation by electrically powered devices, including computing devices (such as server computers, network switches, firewalls, or other computing devices); power utility devices (such as transformers, generators, inverters, meters, or other electrical grid systems); and other electrically powered or electronically controlled devices. These EMI signals are commonly regarded as noise, but these EMI signals can also carry information that can be used to generate unique EMI fingerprints for the device. For example, the EMI given off by a target device with an unknown configuration of components can be scanned to generate a target EMI fingerprint for the target device. The generated target EMI fingerprint can be compared with reference EMI fingerprints of reference devices of known configurations to confirm that the target device is of a known make, model, and configuration, or notify that the target device is not of a known make, model, and configuration and therefore may contain one or more suspected counterfeit components, or may be suspected to be entirely counterfeit.

This technique of counterfeit detection is "passive" because it does not involve disassembling the electronics of a target device to perform internal inspections, such as visual or photographic inspections. Note that counterfeit detection techniques that involve disassembly are ineffective and often cause subsequent problems in the inspected device, even if they do not detect any counterfeit components. In contrast, this passive technique makes it practical to periodically inspect devices in the supply chain, or at ports of entry, or when systems are received by a customer as part of initial setup preparation, during installation, and during power-on-self-test (POST) operations. Hence, this new technique helps to ensure that no counterfeit components or "spy chips" or "mod chips" are installed in electronics at any point in the supply chain before delivery to the end-user. Moreover, this new technique requires no hardware modifications in to the target devices themselves or to the destination systems in which the target devices are being installed, and is therefore backward-compatible with existing and legacy systems.

In one embodiment, a particular form of EMI fingerprint, the EMI kiviat tube fingerprint (EMI-KT fingerprints) may be employed to enhance the sensitivity of the detection and identification of counterfeit components or counterfeit devices. In one embodiment, a kiviat tube is a series of kiviat plots (also known as spider plots, star charts, or radar charts) of data at time intervals, such as evenly spaced time intervals. A kiviat plot is a multi-vector line graph for showing multi-variate data in two-dimensions with the values of the data represented on axes starting from the same point. Kiviat plots are well-suited for showing outliers and commonality between data sets. In one embodiment, the EMI-KT fingerprint includes the data required to describe each kiviat plot that makes up a kiviat tube. For example, the EMI-KT fingerprint may include a time-series of kiviat plots of N axes. Each axis represents signal strength at one of N frequencies. The N frequencies are N frequencies that are determined to best reflect dynamics of a target device. These N frequencies thus best convey information about the response of the target device to a dynamic test sequence.

Note that while in one embodiment, the kiviat tubes of reference and/or target EMI-KT fingerprints may be generated and visually displayed on a graphical user interface (GUI) for user reference, the characteristics of representing an EMI fingerprint as a kiviat tube more importantly improves an EMI counterfeit detection system's ability to distinguish genuine devices from counterfeit devices. Forming an EMI fingerprint as a "dynamically scrolling tube" of kiviat plots along a time axis provides a richly detailed fingerprint that is especially sensitive to differences between reference and target fingerprints. This is due at least in part to the nature of the kiviat plot. In a kiviat plot, the area contained grows proportionally to the square of the linear measures, thus emphasizing even minor differences between the signal strengths at a particular time observation as an area between the reference and target plots. Integrating these areas over time to produce a "residual volume" over the observations of an EMI-KT fingerprint increases the sensitivity to deviation beyond that of other EMI fingerprinting techniques. The residual volume—the time integration over a series of time observations of a residual area between a reference (golden system) and a target (unit under test) kiviat plot of signal strengths at the top N most informative frequencies—forms a new prognostic metric. In one embodiment, the cumulative cylindrical error metric (or CCEM, described in further detail elsewhere herein) is one form of the residual volume. The residual volume (and its variations, such as the CCEM) may be used to contribute substantially improved difference detection (sensitivity) to a systematic prognostic algorithm for deterministic and reproducible discrimination between counterfeit and authentic systems and components.

In one embodiment, a reference EMI-KT fingerprint is taken from a reference device for make, model, and configuration (or "type") of device. The reference device for a make, model, and configuration is one that is confirmed to be a genuine example of the make, model, and configuration of device (which may be referred to as a "Golden System" or "GS"). In one embodiment, the reference device is further confirmed to be operating optimally, or at least confirmed to be operating within accepted parameters. In one embodiment, the target device (which may be referred to as a "Unit Under Test" or "UUT") undergoes a pattern recognition process that compares a target EMI-KT fingerprint taken from the target device against the reference EMI-KT fingerprint using a configuration similarity metric called Cumulative Cylindrical Error Metric (CCEM).

Although embodiments may be described herein in the context of a power utility device, the general principles and techniques of kiviat tube based EMI fingerprinting for counterfeit device detection described herein can be applied to any electronic system that comprises at least one electronic component, including, but not limited to computing devices (such as servers, workstations, network switches, routers, firewalls, mobile phones, tablets, smart phones); vehicles (such as automobiles, buses, motorcycles, trains, streetcars, or other powered ground vehicles; boats, ships, submarines, or other watercraft; airplanes, helicopters, airships or other aircraft; spacecraft and satellites—all whether autonomous or manually operated, fuel or electrically powered); medical devices (such as x-ray machines, magnetic resonance imaging machines, and other medical imaging devices, patient monitoring devices, diagnostic equipment, pacemakers, powered prosthetics, hearing aids); weapons systems (such as missiles, military vehicles, electromagnetically accelerated projectile launchers, energy weapons, radar, sonar, and other tracking systems); robotics and production systems (process control devices or controllers, assembly robots, mobile robots, 3D printers or other additive manufacturing, sensors); and a wide variety of other electrically powered devices. Utility devices (such as transformers) provide a convenient and simple example for illustrating the systems, methods, and other embodiments for kiviat tube based EMI fingerprinting for counterfeit device detection, but are not intended to be limiting. Thus, where an embodiment herein describes the reference device and target device as utility devices, in other embodiments, the reference device and target device may be, for example, a computing device, a vehicle, a medical device, a weapons system, a robot, a controller, or another device that includes electrically powered components.

—Example EMI Fingerprint Counterfeit Detector—

FIG. 1 illustrates one embodiment of an EMI fingerprint counterfeit scanner 100 and an example target device 105 associated with kiviat tube based EMI fingerprinting for counterfeit device detection. EMI fingerprint counterfeit scanner 100 includes an antenna (or other EMI signal sensor) 115 connected to a radio 120 such as a software-defined radio, AM/FM radio, or other radio configured for connection to the EMI fingerprint counterfeit scanner 100. EMI fingerprint counterfeit scanner 100 also includes local data storage 150 connected to radio 120. EMI fingerprint counterfeit scanner 100 also includes high-sensitivity EMI kiviat tube counterfeit component detection and identification logic 155. EMI fingerprint counterfeit scanner 100 also includes network interface 160 and a display 165.

Note that utility device 105 generates EMI signals 110 when power is provided to the utility device 105. The utility device 105 may generate similar signals of a first type while the device is in a high-power, fully-loaded, or otherwise energized state, and may generate similar signals of a second type while the device is in a low-power, idle, or otherwise de-energized state. Note further that the utility device 105 may continue to generate EMI signals 110 after power to the utility device 105 is cut (a de-energized state), at least for a time. The EMI signals are generated from one or more internal components of the utility device 105, which may include, but are not limited to controls, switches, motors, inductor/transformer windings, capacitors, sensors, and other components. In some instances, the EMI signals may be generated by interactions between multiple components. In one embodiment, antenna 115 is configured to sense EMI signals 110 and apply the EMI signals to radio 120 that is coupled to antenna 115. Depending on the configuration of antenna 115 and radio 120, the EMI signals are sensed across a broad spectrum of frequencies, for example from approximately 500 kilohertz up to approximately 4 gigahertz. Other ranges may also be appropriate, and the range of frequencies available to the EMI fingerprint counterfeit scanner 100 may be governed by the combination of antenna 115 and radio 120.

In one embodiment, antenna 115 may include: a dipole antenna, a Yagi-Uda antenna, a loop antenna, an electrical short antenna (e.g., an open-ended wire having a length less than a quarter wavelength), a fractal antenna, a parabolic antenna, a microstrip antenna, a quad antenna, a random wire antenna (e.g., an open-ended wire having a length greater than one wavelength), a beverage antenna, a helical antenna, a phased array antenna, and any other type of antenna now known or later developed. In one simple and inexpensive embodiment, antenna 115 may be an insulated wire with a fixed length of the insulation stripped off. In one embodiment, the type and length of the antenna can be selected to achieve optimal discrimination sensitivity and robustness.

Antenna 115 can be positioned either in close proximity to the target utility device 105, or further away from the target utility device 105. To achieve better sensitivity in antenna 115 and hence higher signal-to-noise ratio (SNR) in EMI fingerprint counterfeit scanner 100, a smaller distance between the target utility device 105 and antenna 115 is preferred. In addition to distance, the sensitivity of antenna 115 can also be affected by its orientation with respect to the target utility device 105.

In one embodiment, antenna 115 is positioned at a predetermined distance and orientation with respect to target utility device 105 during a scan. This predetermined distance and orientation may be the same distance and orientation used to detect reference EMI signals from a reference utility device of the same make and model as the target utility device 105. The consistency of antenna placement with respect to the utility devices being scanned can increase the ability of the EMI fingerprint counterfeit scanner 100 to match target EMI fingerprints with reference EMI fingerprints, and distinguish target EMI fingerprints from reference EMI fingerprints.

In one embodiment, the antenna 115 may be affixed to the EMI fingerprint counterfeit scanner 100. In one embodiment, the antenna 115 may be in a fixed position (distance and orientation) with respect to the target utility device 105 during a scan of the target utility device 105 by the EMI fingerprint counterfeit scanner 100. For example, the antenna 115 may be placed in a location proximate to the target utility device 105 and not moved during the scan. The antenna 115 may be affixed to a housing of the target utility device 105, or may be affixed within the housing of target utility device 105. The antenna 115 may be affixed mechanically, such as with a bolt, screw, or clip, magnetically, or with adhesive, such as sensor wax. In one embodiment, multiple antennas and/or radios (not shown) may be positioned at different locations and orientations with respect to the target utility device 105 during the scan, and the measurements taken from the multiple antennas and/or radios may be merged. In one embodiment, antenna 115 is moved to multiple different locations and orientations with respect to the target utility device 105 over the course of the scan. Implementations of these various antenna positions and configurations, as well as other positions and configurations, may be selected as desirable to improve signal-to-noise ratio (SNR) of the detected EMI signals for the overall target utility device 105, or to emphasize EMI signals emitted by specific components the target utility device 105.

In one embodiment, radio 120 is configured to convert the received EMI signals from analog signals to digital signals, and record the power amplitude and frequency of the signals at defined time intervals. In one embodiment, radio 120 may store the recorded signals as a data structure in local data storage 150, or provide them directly to high-sensitivity EMI kiviat tube counterfeit component detection and identification logic 155 for analysis.

In one embodiment, local data storage 150 is the local data store of the mobile device or computer. In one embodiment, high-sensitivity EMI kiviat tube counterfeit component detection and identification logic 155 is a processor of the mobile device or computer specially configured with instructions to execute one or more of the functions of the system described herein. For example, the instructions may be stored in local data storage 150, and retrieved by the processor as needed to execute logic 155.

—Example Environment for EMI Fingerprint Scanning—

Figure 2:
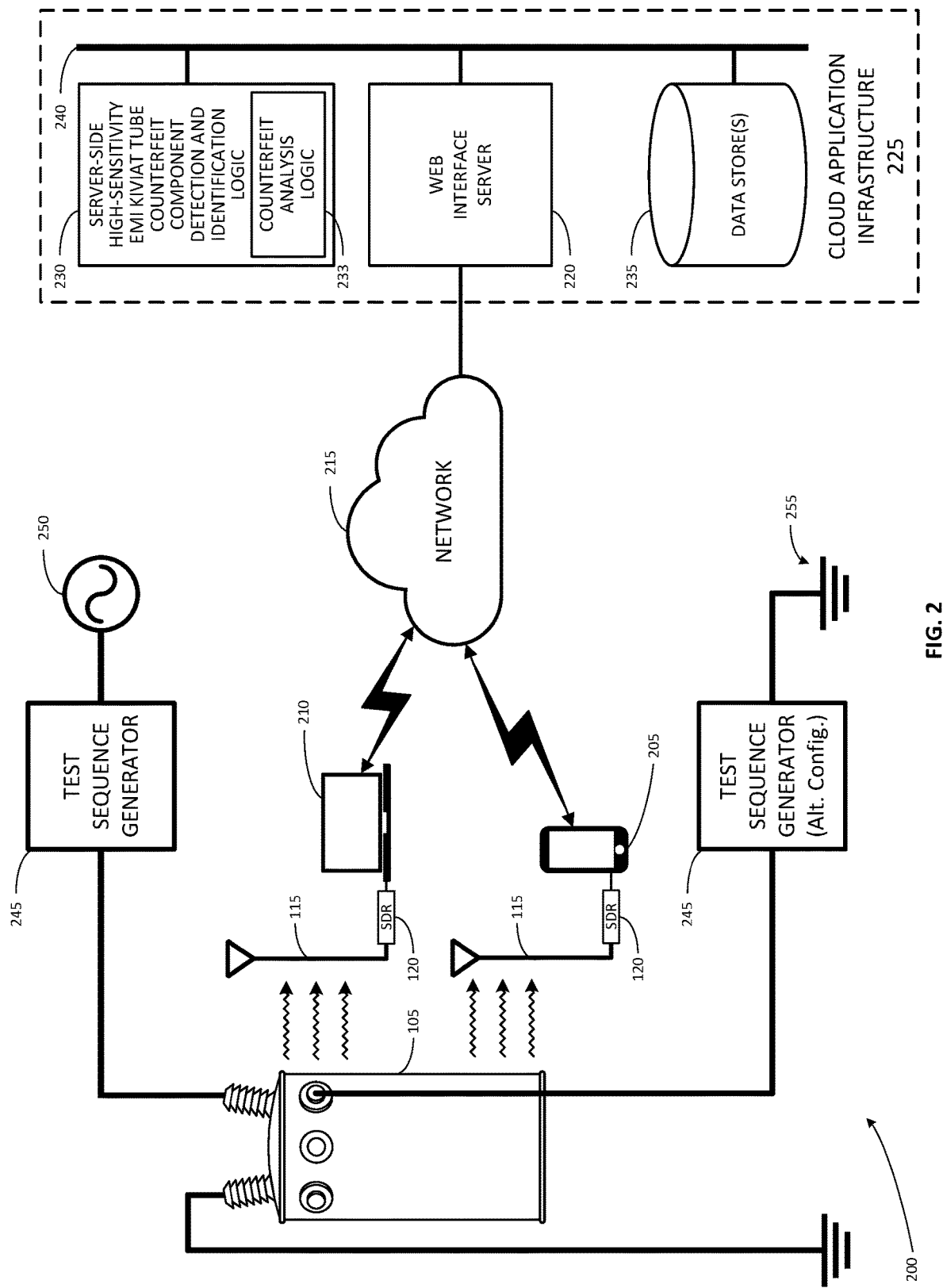
FIG. 2 illustrates one embodiment of an environment in which to operate an EMI fingerprint counterfeit scanner associated with kiviat tube based EMI fingerprinting for counterfeit device detection.

FIG. 2 illustrates one embodiment of an environment 200 in which to operate EMI fingerprint counterfeit scanner 100 associated with kiviat tube based EMI fingerprinting for counterfeit device detection.

In one embodiment, EMI fingerprint counterfeit scanner 100 is a mobile device 205 or computer 210 coupled with a software defined radio 120 and antenna 115. In one embodiment, network interface 160 is configured to enable the EMI fingerprint counterfeit scanner 100 to interact with one or more remote computers over a communications network 215. In one embodiment, the EMI fingerprint counterfeit scanner 100 may send requests to and receive responses from web servers such as web interface server 220. These communications may take the form of remote representational state transfer (REST) requests using JavaScript object notation (JSON) as the data interchange format for example, or in another example, simple object access protocol (SOAP) requests to and from XML servers.

In one embodiment, web interface server 220 is configured to enable EMI fingerprint counterfeit scanner 100 to access resources provided by cloud application infrastructure 225. In addition to web interface server 220, the cloud application infrastructure 225 also includes server-side high-sensitivity EMI kiviat tube counterfeit component detection and identification logic ("server-side logic") 230 and one or more data storage devices 235. The web interface server 220, server-side logic 230, and data storage devices 235 are interconnected by a local network 240. In one embodiment, server-side logic 230 is one or more computing devices specially configured with instructions to execute one or more of the functions of the system described herein.

In one embodiment, the analysis of target EMI-KT fingerprints is performed by EMI fingerprint counterfeit scanner 100. In one embodiment, he analysis of target EMI-KT fingerprints is performed by server-side logic 230 in response to a request from EMI fingerprint counterfeit scanner 100, and the results are returned to EMI fingerprint counterfeit scanner 100 for display to the user.

In one embodiment, the cloud application infrastructure 225 is operated as a counterfeit analysis system by at least a portion of server-side logic 230, counterfeit analysis logic 233. In one embodiment, the cloud application infrastructure 225 is a multi-tenant system for storing and processing information associated with EMI fingerprint counterfeit detection and identification for one or more operating companies who are tenants of the cloud application infrastructure. The counterfeit analysis system is configured to analyze information associated with the EMI-KT fingerprints of suspected and confirmed counterfeit utility devices provided by one or more tenants of the counterfeit analysis system with a variety of analytics tools. The information analyzed may be submitted by the tenants of the system, by manufacturers of utility devices, or by law enforcement entities. The analyses may be performed within information provided only by a single tenant, or across information provided by multiple tenants. The analyses may include identifying how common or prevalent utility devices with a suspected or confirmed counterfeit configuration are. The analyses may provide further subdivisions of this prevalence information, for example indicating the prevalence of a suspected or confirmed counterfeit configuration: in a specific geographic region or location, in a particular tenant's systems or installations, and in detection at a particular port of entry or other location in a supply chain. The analyses may also identify commonalities between supply chain information for multiple instances of detected counterfeit utility devices to identify potential sources of counterfeit systems. In general, analyses that are helpful for identifying a source of counterfeit utility devices or are helpful for identifying undetected counterfeit utility devices previously installed in utility systems may be included in the counterfeit analysis logic 233.

In one embodiment, environment 200 is also provided with a test sequence generator 245. The test sequence generator 245 operates to that control the power through one or more components in the target utility device 105. In operation, the test sequence generator 245 may create square waves of power amplitude through components of the target utility device 105. The instructions for the test sequence, including amplitude and duration of the square waves, may be pre-programmed in the test sequence generator 245 and/or be controlled by the EMI fingerprint counterfeit scanner 100.

In one embodiment, for some types of utility devices, appropriate square waves may be generated by toggling the power supply delivered to the target utility device 105 between a high-power and a low-power supply state to place the target utility device 105 into an "energized" operating state (at high power supply) and a "de-energized" operating state (at low power supply). In one embodiment, the energized state may be a full-power power supply state. In one embodiment, the energized state may be a power supply state that is relatively higher than the low-power supply state, and the de-energized state is a power supply state that is relatively lower than the high-power supply state. In one embodiment, the de-energized state may be a power supply state of complete cut off of the power supply—a "no power" power supply state. In one embodiment, the de-energized state may be an "idle" power supply state, where the power supplied to the target utility device 105 is the minimum power necessary maintain operation of the target utility device 105 at the lowest possible power level. In this configuration, the test sequence generator 245 is placed in-line between the power supply 250 and the target utility device 105 and controls the delivery of power from power source 250 to the target utility device 105. The test sequence generator is configured to provide a test sequence of high-power and low-power power supply to the target utility device 105 in accordance with instructions for a test sequence of energizing and de-energizing the target utility device 105.

In another embodiment, for some types of utility devices, appropriate square waves may be generated by toggling a load on the target utility device 105 between a high-power and a low-power draw state to place the target utility device 105 into the energized operating state (at high power draw) and the de-energized operating state (at low power draw). In one embodiment, the energized state may be a full-power power draw state. In one embodiment, the energized state may be a power draw state that is relatively higher than the low-power draw state, and the de-energized state is a power draw state that is relatively lower than the high-power draw state. In one embodiment, the de-energized state may be a power draw state of complete cut off of the load—a "no power" power draw state. In one embodiment, the de-energized state may be an "idle" power draw state, where the power drawn from to the target utility device 105 is the minimum power necessary maintain operation of the target utility device 105 at the lowest possible power level. In this alternate configuration, the test sequence generator 245 is placed in-line between the target utility device 105 and ground 255 and controls the power load drawn from target utility device 105. The test sequence generator is configured to provide a test sequence of high-power and low-power power draw (load) to the target utility device 105 in accordance with instructions for a test sequence of energizing and de-energizing the target utility device 105.

In one embodiment, the test sequence of energizing and de-energizing includes multiple energizations or de-energizations. In one embodiment, the test sequence cycles between approximately equal portions of (i) providing high power supply or load to place the target device in an energized state, and (ii) providing low power supply or load to place the target device in a de-energized state. In one embodiment, a test sequence with a cycle of 30 seconds at high power supply or load to the target device (energized) and 30 seconds at low power supply or load to the target device (de-energized) may be appropriate. In other embodiments, other test sequences may be appropriate, for example with shorter or longer energize/de-energize periods, or with unequal energize/de-energize periods. In one embodiment, the test sequence generator is configured to automatically control power or load to alternately energize and de-energize the target device in a repeatable test sequence.

In one embodiment, where the test sequence generator 245 controls the power supply of a utility device, test sequence generator 245 provides high-power and low-power from power supply 250 to an input (such as one of the primary terminals of a transformer) to respectively energize and de-energize the utility device in a test sequence. For example, power to the utility device is alternatively provided and interrupted in a repeated cycle. In another embodiment, where the test sequence generator 245 controls the power load drawn from the utility device, test sequence generator 245 provides high-power and low-power loads on an output (such as one of the secondary terminals of a transformer) to respectively energize and de-energize the utility device in a test sequence. For example, load on the utility device is alternatively exerted and ceased in a repeated cycle.

In one embodiment, the test sequence generator may be configured by the instructions to generate waveforms other than square waves. Wave forms may include gradual transitions between the de-energized state and the energized state, as well as transitions to and from different, partially energized states.

In one embodiment, where the target device is a computing device or otherwise includes a programmable or configurable microprocessor, the target device may self-generate the test sequence. In one embodiment, the target device is provided with microprocessor-executable instructions for a test sequence, which, when executed by the microprocessor of the target device, cause the target device to operate with a load that oscillates in a square, sinusoidal, or otherwise pre-determined waveform between an energized and a de-energized state, causing similar oscillations of EMI emissions from the target device. For example, the test sequence configures the target device (by software or firmware) to run a particular pulse width modulation (PWM) load in form of a sinusoidal wave. In one embodiment, such a PWM load profile may be generated for the target device substantially as shown and described in U.S. Pat. No. 8,200,991 B2 entitled "Generating a PWM Load Profile for a Computer System", the entirety of which is incorporated by reference herein.

In one embodiment, the test sequence generator 245 can be added to a staging area for initial Power-On-Self-Testing (POST). Utility assets are commonly unpackaged and then first energized in POST testing before installing in production systems. Accordingly, it is a convenient time to perform an EMI-KT fingerprint counterfeit scan while the target utility device is set up for POST testing. In one embodiment, the test sequence is applied to the target utility device while the target utility device is set up in a staging area for testing.

—Example Configuration Discovery and Counterfeit Detection Method—

In one embodiment, one or more steps of methods described herein may be performed by a processor (such as processor 710 as shown and described with reference to FIG. 7) of one or more computing devices (i) accessing memory (such as memory 715 and/or other computing device components shown and described with reference to FIG. 7) and (ii) configured with logic to cause the system to execute the step of the method (such as kiviat tube based EMI fingerprinting for counterfeit device detection logic 730 shown and described with reference to FIG. 7). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing any data calculated, determined, generated, classified, or otherwise created. References to storage or storing indicate storage as a data structure in memory or storage/disks of a computing device (such as memory 715, or storage/disks 735 of computing device 705 or remote computers 765 shown and described with reference to FIG. 7).

In one embodiment, a subsequent step of a method may commence in response to parsing a signal received or stored data retrieved indicating that the previous step has been performed at least to the extent necessary for the subsequent step to commence. Generally, the signal received or the stored data retrieved indicates completion of the previous step. Each step of a method may include multiple sub-steps, which may or may not be described herein.

In one embodiment, the steps of the methods described herein are performed by an EMI fingerprint counterfeit scanner 100, (as shown and described with reference to FIGS. 1 and 2). In one embodiment, EMI fingerprint counterfeit scanner 100, is a special purpose computing device (such as computing device 700) configured with high-sensitivity EMI kiviat tube counterfeit component detection and identification logic. In one embodiment, the steps of the methods described herein are performed by the EMI fingerprint counterfeit scanner 100 in conjunction with a remote systems such as cloud application infrastructure 225, configured with server-side high-sensitivity EMI kiviat tube counterfeit component detection and identification logic 230 and/or counterfeit analysis logic 233. In one embodiment, the steps of the method are performed by a special purpose computing system having at least one processor and configured to perform the step described.

Figure 3:
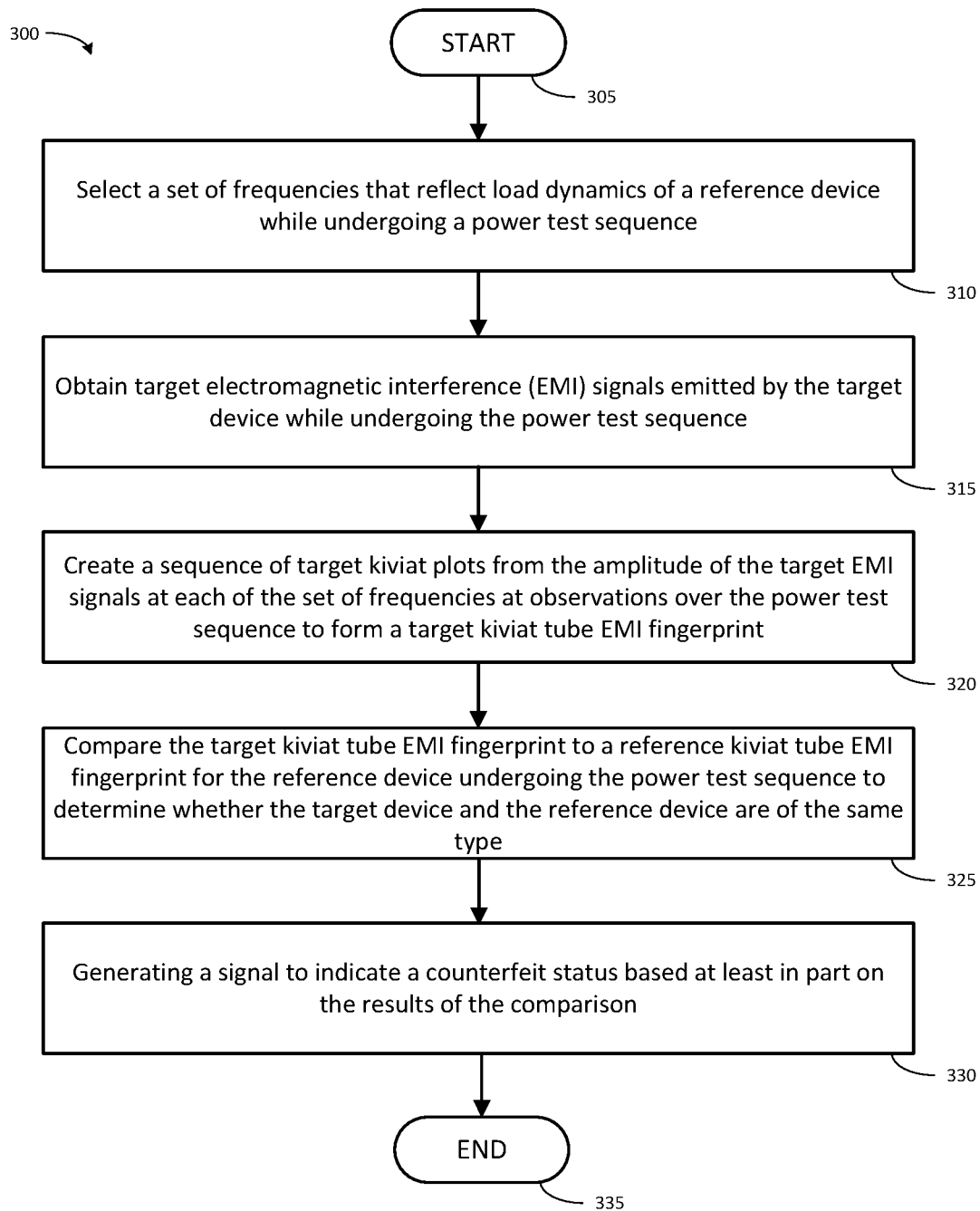
FIG. 3 illustrates one embodiment of a method associated with kiviat tube based EMI fingerprinting for counterfeit device detection.

FIG. 3 illustrates one embodiment of a method 300 associated with kiviat tube based EMI fingerprinting for counterfeit device detection. The method 300 is a method for detecting a counterfeit status of a target device (for example, a status of being genuine, or a status of containing at least one counterfeit component).

The method 300 may be initiated based on various triggers, such as receiving a signal over a network or parsing stored data indicating that (i) a user (or administrator) of EMI fingerprint counterfeit scanner 100 has initiated method 300, for example by providing a signal indicating initiation of a scan using the EMI fingerprint counterfeit scanner 100, (ii) that that method 300 is scheduled to be initiated at defined times or time intervals, (iii) that a target device is in place and ready to be scanned, or (iv) some other trigger indicating that method 300 should begin. The method 300 initiates at START block 305 in response to determining that a parsed signal received or stored data retrieved indicates that the method 300 should begin. Processing continues to process block 310.

At process block 310, the system selects a set of frequencies that reflect load dynamics of a reference device while undergoing a power test sequence. In one embodiment, the set of frequencies is predetermined and stored in a database library of EMI-KT fingerprints, for example a database library stored in local data storage 150 or data stores 235. In one embodiment, the selection of the particular frequencies in the set may be performed by pre-processing to generate a reference EMI-KT fingerprint for a genuine (confirmed to be authentic, "golden system") reference device undergoing a test sequence, and storing the resulting fingerprint, including the set of frequencies, in the database library. In one embodiment, the set of frequencies is selected by requesting the reference EMI-KT fingerprint from the database library, and in response to receiving the reference EMI-KT fingerprint from the database library, parsing the reference EMI-KT fingerprint to identify the set of frequencies. In one embodiment, the set of frequencies determined selected as part of the process for creating an EMI-KT fingerprint of the reference device.

In one embodiment, the reference EMI-KT fingerprint is created. The system collects reference EMI signals emitted by the reference device while the reference device is undergoing a power test sequence. The reference EMI signals are received by an antenna (such as antenna 115) and processed by a radio (such as radio 120). The collected reference EMI signals are stored are stored in local data storage 150 or Data Store 235 for further processing. The system converts the reference EMI signals from a time domain to a frequency domain, for example by performing a fast Fourier transform (FFT) or other appropriate transform on the collected reference EMI signals. The system divides or partitions the frequency range associated with the collected reference EMI signals into a plurality of "bins," and represents each discrete bin with a representative frequency value. For example, the full range of frequencies sensed by the antenna 115 and radio 120, such as the range from approximately 500 kilohertz through approximately 4 gigahertz, may be divided into, for example, 100 bins. In one embodiment, these frequency bins and the associated representative frequency values are equally spaced. In one example, the representative frequency value is a frequency value at the middle of the range of the bin, equidistant from the upper and lower bound frequencies for the bin. In one embodiment the bins and representative frequencies are stored in local data storage 150 or Data Store 235. The system then selects from among those bins the bins with representative frequencies that reflect the load dynamics on the reference device caused by the power test sequence to form the set of frequencies from the representative frequencies for those bins.

In one embodiment, the set of frequencies may be the N frequencies among all reference frequencies that show the most pronounced dynamics caused by the power test sequence—the "top" N frequencies. For example, the system may select a subset of N representative frequency values that are associated with the strongest power spectral density peaks. Signals that have the highest signal-to-noise ratio commonly have the highest peaks on a power-spectral density (PSD) plot. In one embodiment, a transform such as a fast Fourier transform (FFT) is performed for the amplitude-time series for each representative frequency. The representative frequencies are then ranked in order of the results of the transform, ranking the representative frequencies in order of height of peaks. The N representative frequencies with the N highest peaks are selected. The system then sets the N frequencies to be the set of frequencies based on the power spectral frequency analysis.

Note that while any number N of frequencies might be selected to reflect the load dynamics, in one embodiment, the top 9 frequencies (N=9) are selected because 9 frequencies allows for a wide range of representative frequencies while maintaining a relatively low number of vertices when used to create a kiviat plot. There are diminishing returns in informativeness as the number of selected frequencies is increased, while the complexity of kiviat plots of the frequency data increases along with computing load for operations involving them. N=9 frequencies works well in practice. N=20 bins is also satisfactory, and works well in practice, but results in a visually dense kiviat plot when displaying the plot in a graphical user interface.

In one example of generating the reference EMI-KT fingerprint, the power amplitude values of the N frequencies at regular time intervals (observations) over the duration of the test sequence are recorded, for example as a series of tuples (t, value_$F_1$, . . . , value_$F_N$), for example as an array structure in a database. In one embodiment, the sequence of tuples forms the reference EMI-KT fingerprint. In one embodiment, the sequence of plots of the tuples on a kiviat plot with axes for each of the N frequencies forms the reference EMI-KT fingerprint. In one embodiment, the axes of the kiviat plots in the EMI-KT fingerprints are measured in decibels (dB).

In one embodiment, the top N representative frequencies in terms of power amplitude are selected in ascending order of frequency value, such that the lowest representative frequency is selected to be frequency $F_1$, the next lowest representative frequency is selected to be frequency $F_2$, and so on, until the highest representative frequency selected to be frequency $F_N$. In one embodiment, the top N representative frequencies in terms of power amplitude in descending order of frequency value instead. Note in either case, that the power amplitude indicates which of the representative frequencies will be selected, and the frequency value indicates the order that the selected frequencies are assigned. This is for visual clarity in a visualization of the kiviat plot—the axes of the kiviat plot may be labeled with their respective frequency, and it makes visual sense for them to be ordered in ascending or descending order.

Once the system has thus completed selecting a set of frequencies that reflect load dynamics of a reference device while undergoing a power test sequence, processing at process block 310 then completes, and processing continues to process block 315.

At process block 315, the system obtains target electromagnetic interference (EMI) signals emitted by the target device while undergoing the power test sequence. In one embodiment, the power test sequence is executed on the target device to cause the target device (such as device 130) to emit EMI signals (such as EMI signals 110). In one embodiment, the power test sequence performed on the target device at process block 315 is the same power test sequence originally performed on the reference device to generate the reference EMI-KT fingerprint. In other words, the same test sequence is used for generating both the reference EMI-KT fingerprint and the target EMI-KT fingerprint.

The target EMI signals are received by an antenna (such as antenna 115) and processed by a radio (such as radio 120). The collected target EMI signals are stored are stored in local data storage 150 or Data Store 235 for further processing. In one embodiment, the signals are stored as tuples of time, frequency, and power amplitude values (t, f, p). In one embodiment, the signals are stored in a flat file data set that has columns for the frequencies and rows for the observations (time), and the power amplitude values at each row-column entry. In one embodiment, the system converts the target EMI signals from a time domain to a frequency domain, for example by performing a fast Fourier transform (FFT) or other appropriate transform on the collected target EMI signals. In one embodiment, the observation rate may be one observation per second, although higher and lower rates may be selected based on the pace of transitions in the test sequence. In one embodiment, the EMI signals across the full range of frequencies sensed by the antenna 115 and radio 120, such as the range from approximately 500 kilohertz through approximately 4 gigahertz, are stored. In one embodiment, the EMI signals received for only the N frequencies in the set of frequencies that reflect the load dynamics of the reference device are stored. Thus, in one embodiment, the EMI "noise" signals emanating from a device is processed into digitized multivariate time series data.

In one embodiment, the collection of target EMI signals is performed as part of the obtaining step. In one embodiment, the collection of target EMI signals from the target device is performed prior to the obtaining step and stored, for example in local data storage 150 or Data Store 235. To obtain the target EMI signals, the stored target EMI signals are then requested and then retrieved from the local data storage 150 or Data Store 235.

Once the system has thus completed obtaining target EMI signals emitted by the target device while undergoing the power test sequence, processing at process block 315 then completes, and processing continues to process block 320.

At process block 320, the system creates a sequence of target kiviat plots from the amplitude of the target EMI signals at each of the set of frequencies at observations over the power test sequence to form a target kiviat tube EMI fingerprint (EMI-KT fingerprint). In one embodiment, to generate the sequence of target kiviat plots, the raw (observed) power amplitude values of the N frequencies for the target EMI signals are recorded at regular time intervals (observations) over the test sequence. In one embodiment, the time intervals applied to the target EMI signals should be aligned or synchronized with the time intervals applied to the reference EMI signals, ensuring synchronization between the reference and target waveforms generated by the test sequence.

As with generation of the reference EMI-KT fingerprint above, the raw (observed) power amplitude values at each frequency of the set of N frequencies may be recorded as a series of tuples (t, value_$F_1$, . . . , value_$F_N$), for example as an array structure in a database (such as may be maintained in local data storage 150 or data stores 235). In one embodiment, the sequence of tuples forms the target EMI-KT fingerprint. In one embodiment, the sequence of plots of the tuples on a kiviat plot with axes for each of the N frequencies forms the target EMI-KT fingerprint. The fingerprint is stored, for example in local data storage 150 or data stores 235, for further processing.

In one embodiment, the creation step described with reference to process block 320 also includes generating an estimate of the amplitude at each of the set of N frequencies by a state estimation model trained on the reference kiviat tube EMI fingerprint. The resulting target kiviat plot is a kiviat plot of the estimate, rather than a plot of the raw (observed) power amplitude values. In one embodiment, the creation step includes generating state estimation model (such as an MSET model, MSET 2 model, or other model generated by a non-parametric pattern recognition algorithm) of "authentic" behavior of a given device, for example by training an MSET model with the reference kiviat plots of the reference kiviat tube. Although it is advantageous to use MSET for pattern-recognition purposes, the disclosed embodiments can generally use any nonlinear, nonparametric (NLNP) regression, which includes neural networks, support vector machines (SVMs), auto-associative kernel regression (AAKR), and even simple linear regression (LR). In one embodiment, the MSET model is further trained with additional amplitude-time series information for frequencies other than those belonging to the selected set of frequencies, such as other frequencies in the bins to which the selected frequency also belongs. For each observation, the raw (observed) target power amplitude value at each of the N frequencies are provided to the trained MSET model to generate an estimated target power amplitude value for each of those N frequencies. The estimated target amplitude value for each frequency is stored as the amplitude value in the target kiviat plot for that observation, in place of the raw (observed) target amplitude value. Thus, the resulting kiviat tube of kiviat plots is a series of kiviat plots of MSET estimates of the power amplitude for each of N frequencies, rather than a series of kiviat plots of raw (observed) the power amplitude for each of N frequencies. This raw-to-estimate replacement process has a smoothing effect which serves to eliminate noise from the target EMI-KT fingerprint.

Once the system has thus completed creating a sequence of target kiviat plots from the amplitude of the target EMI signals at each of the set of frequencies at observations over the power test sequence to form a target kiviat tube EMI fingerprint Processing at process block 320 then completes, and processing continues to process block 325.

At process block 325, the system compares the target kiviat tube EMI fingerprint to a reference kiviat tube EMI fingerprint for the reference device undergoing the power test sequence to determine whether the target device and the reference device are of the same type.

In one embodiment, the reference kiviat tube EMI fingerprint for the reference device is retrieved from a library database (such as may be maintained in local data storage 150 or data stores 235). In one embodiment, the library database is maintained remotely, for example by cloud application infrastructure 225 in accordance with server-side logic 230, and a REST request requesting transmission of the reference EMI-KT fingerprint is composed by the EMI fingerprint counterfeit scanner 100 and sent though network interface 160 to web interface server 220. In one embodiment, the library data base is maintained locally in accordance with logic 155 in local data storage 150, and a request to retrieve the reference EMI-KT fingerprint is composed by the EMI fingerprint counterfeit scanner 100.

In one embodiment, the target kiviat plot values and reference kiviat plot values at each observation of the target and reference kiviat tubes are plotted on the same kiviat plot. In one embodiment, the magnitude of the area between the target and reference plots at each observation is calculated, and added to a cumulative sum of this magnitude over each time observation (that is, the area is integrated along a time (observation) axis). The cumulative sum over all time observations is evaluated to determine if it satisfies a threshold test. Thus, the comparison may generate an error metric from annular residuals between a target kiviat plot and a reference kiviat plot at the same observation in the reference kiviat tube EMI fingerprint, where the error metric is the cumulative area of annular residual between the reference kiviat plots and target kiviat plots over all observations. Generally, as congruence between the target and reference plots indicates that the target and reference devices behave similarly in response to the same test sequence, an error metric (cumulative area) value lower than the threshold will indicate that the target and reference devices are of the same type. Similarly, as divergence between the target and reference plots indicates that the target and reference devices behave differently in response to the same test sequence, an error metric (cumulative area) value higher than the threshold will indicate that the target and reference devices are of different types.

Thus, in one embodiment, the residual area between kiviat plots of EMI signal strengths at optimally selected representative frequencies for reference (golden system) and target (unit under test) for each time observation in a kiviat tube are time integrated to produce a residual volume for the kiviat tube. The residual volume for the target EMI-KT fingerprint may be used as a prognostic metric for determining whether the target EMI-KT fingerprint represents an authentic or suspect device by comparison with the threshold.

In one embodiment, the threshold is a pass-fail magnitude generated by comparing the reference EMI-KT fingerprint against target EMI-KT fingerprints taken from one or more other devices authenticated to be of the same configuration as the reference device, or EMI-KT fingerprints taken repeatedly from the same reference device. The threshold is set so as to include the error metric for each of these comparisons within the magnitudes that satisfy the threshold test. In one embodiment, the largest error metric value across the multiple fingerprint comparisons may be set as the threshold value, where error metric values beyond the threshold value do not satisfy the threshold test. In one embodiment, a small additional margin, such as 5 percent or 10 percent of that largest error metric is added to the largest error metric, and the resulting sum may be set as the threshold value.

In one embodiment, the comparison also includes normalizing each axis of each target kiviat plot to a unit circle passing through a value plotted on that axis in a corresponding reference kiviat plot at the same observation in the reference kiviat tube EMI fingerprint. Thus, each of the N frequency axes of the target kiviat plot are adjusted such that a unit circle would pass through each of the N power amplitude values of the reference kiviat plot for the same time. For example, in a 3 frequency target plot, where the reference plot for the same time has power amplitude 20 dB at Frequency 1, power amplitude 30 dB at Frequency 2, and power amplitude 10 dB at Frequency 3, the axes of the target plot would be adjusted or normalized such each of these reference power amplitude values lay on a unit circle, and the amplitude values of the target plot would be plotted on these normalized axes.

In one embodiment, the normalized target kiviat plot for each observation is compared with the unit circle. In one embodiment, the magnitude of the area between the target kiviat plot on the normalized axes and the unit circle is calculated and added to a cumulative sum of this magnitude over each observation (that is, the area is integrated along a time (observation) axis). This area integrated across each observation (point in time) during the duration of the test sequence may be referred to as the cumulative cylindrical error metric (CCEM). Thus, the CCEM is a measure of the difference between the reference (golden system) EMI-KT fingerprint and the target (unit under test) EMI-KT fingerprint. The CCEM is evaluated to determine if it satisfies a threshold test. As above, congruence between the target plot and the unit circle indicates that the target and reference devices behave similarly in response to the same test sequence, and a CCEM value lower than the threshold indicates that the target and reference devices are of the same type. And as above, divergence between the target plot and unit circle indicates that the target and reference devices behave differently in response to the same test sequence, and a CCEM value higher than the threshold indicates that the target and reference devices are of different types.

Thus, the comparison also includes generating an error metric, such as the CCEM, from annular residuals between a target kiviat plot on axes normalized to represent a corresponding reference kiviat plot at the same observation in the reference kiviat tube EMI fingerprint as a unit circle and the unit circle. The error metric is the cumulative area of annular residual between the unit circle and target kiviat plots over all observations. Thus, the system generates a cumulative cylindrical error metric across all observations of the target and reference kiviat tube EMI fingerprints.

The use of the CCEM metric enables detection between anomalous and authentic components for devices that operate at all different types of power levels by normalizing the decibel values of the N reference frequencies at each observation. Thus, the threshold need not be defined based the configuration of the reference device, but instead can be based on deviation from the unit circle. A universal threshold test for CCEM can then be applied to all devices, regardless of power level. In one embodiment, a threshold value of approximately 10 works well in practice. In another embodiment, threshold values between 10 and 30 inclusive work well in practice.

In one embodiment, this comparison of the target kiviat tube EMI fingerprint to a reference kiviat tube EMI fingerprint may be performed locally, for example on the EMI fingerprint counterfeit scanner 100 implementing high-sensitivity EMI Kiviat tube counterfeit component detection and identification logic 155. In one embodiment, this comparison may be performed remotely, in response to a request (such as a REST request) and transmission of the target kiviat tube by EMI fingerprint counterfeit scanner 100 to a remote system, such as cloud application infrastructure 225 implementing server-side high-sensitivity EMI kiviat tube counterfeit component detection and identification logic 230.

Once the system has thus completed comparing the target kiviat tube EMI fingerprint to a reference kiviat tube EMI fingerprint for the reference device undergoing the power test sequence to determine whether the target device and the reference device are of the same type, processing at process block 325 then completes, and processing continues to process block 330.

At process block 330, the system generates a signal to indicate a counterfeit status based at least in part on the results of the comparison. In one embodiment, the system determines a reference type of the reference EMI-KT fingerprint. Note that method 300 may be applied both to identify target devices as either genuine or suspected counterfeits as well as to identify target devices as either confirmed counterfeits of a known type or of an unknown type of device by comparing target devices against reference EMI-KT fingerprints for authenticated genuine devices, or for known configurations of counterfeit device, respectively. Thus, the reference type of the reference EMI-KT fingerprint can be either a "genuine device" or a "known counterfeit" reference EMI-KT fingerprint. Then, the system composes a signal indicating the results of the threshold test of the error metric in the context of the reference type of the reference EMI-KT fingerprint.

For example, where the reference device is a genuine device of a particular type, in response to the determination (by the threshold test) that that the target device and reference device are (i) of the same type (threshold test is satisfied), the system can generate the signal to indicate that the target device is confirmed to be genuine, and (ii) not of the same type (threshold test is satisfied), the system can generate the signal to indicate that the target device is a suspected counterfeit. Or, for example, where the reference device is a known counterfeit device of a particular type, in response to the determination (by the threshold test) that that the target device and reference device are (i) of the same type (threshold test is satisfied), the system can generate the signal to indicate that the target device is confirmed to be a counterfeit device of the particular type, and (ii) not of the same type (threshold test is not satisfied), the system can generate the signal to indicate that the target device is not of the particular type of counterfeit device.

In one embodiment, the counterfeit status may be displayed as a visual alert presented on a graphical user interface, such as authenticity certification 465 shown and described with reference to FIG. 4, and counterfeit alarm 565 shown and described with reference to FIG. 5.

In one embodiment the system simply composes a signal indicating the results of the threshold test of the error metric. The signal is then stored in local storage, or transmitted to a display device or remote system for further use.

Once the system has thus completed generating a signal to indicate a counterfeit status based at least in part on the results of the comparison, processing at process block 330 then completes, and processing continues to END block 335, where process 300 ends.

—Counterfeit Analysis System—

In one embodiment, the resulting indication of counterfeit status from method 300 may be further enhanced by a counterfeit analysis system, such as cloud application infrastructure 225 as controlled by counterfeit analysis logic 233. For example, in response to the signal that the target device is a suspected counterfeit, the system may transmit the target kiviat EMI fingerprint, along with the signal that the device is a suspected counterfeit, to a counterfeit analysis system. For example, the EMI fingerprint counterfeit scanner 100 may compose a request, such as a REST request with an indication that the target kiviat EMI fingerprint is a suspected counterfeit, and transmit the request along with the target kiviat EMI fingerprint from network interface 160 to web interface server 220. In response to receiving the request, counterfeit analysis logic 233 will further process the target kiviat EMI fingerprint and accompanying information.

In one embodiment, the request transmitted to the counterfeit analysis system may include additional supply chain information about the target device. The supply chain information may include any information made available to the system about how the target device was constructed, and how it made its way to the test location. This supply chain information, as well as the target EMI-KT fingerprint, may be transmitted to the counterfeit analysis system for storage (in data store 235), analysis (by counterfeit analysis logic 233), and future reference in scans of other target devices (as a reference EMI-KT fingerprint in a library database).

Analyses of the target EMI-KT fingerprint (and supply chain information, if any) by counterfeit analysis logic 233 may generate additional information that may be useful to one or more users of the system. For example, in response to the signal that the target device is a suspected counterfeit, and after transmitting the request to the counterfeit analysis system, the system may receive additional information about the suspected counterfeit configuration from a counterfeit analysis system, such as one or more of: (i) a confirmation that the suspected counterfeit is a counterfeit of a known type; (ii) prevalence information describing how common devices with the suspected counterfeit configuration are; (iii) source information describing the origin of devices with the suspected counterfeit configuration; and/or (iv) supply chain information describing how the target device may have entered the supply chain. Item (i) may be based on performing the method 300 to compare the suspected counterfeit target EMI-KT fingerprint against one or more known counterfeit reference EMI-KT fingerprints until a match is found, or the known counterfeit reference EMI-KT fingerprints available to the counterfeit analysis system are exhausted. Items (ii)-(iv) may be based on analysis of information provided only by a single tenant of the counterfeit analysis system, or across information provided by multiple tenants. In one embodiment, in response to receiving the additional information, the EMI fingerprint counterfeit scanner 100 (or another computing device (not shown) connected to the cloud application infrastructure 225) may display some or all of the additional information on a graphical user interface, such as those shown and described with reference to FIGS. 4 and 5.

—Graphical User Interface for Result Display—

In one embodiment, the system further displays information based at least in part on the signal with a graphical user interface. The information displayed may also be based on the reference and target EMI-KT fingerprints.

Figure 4:
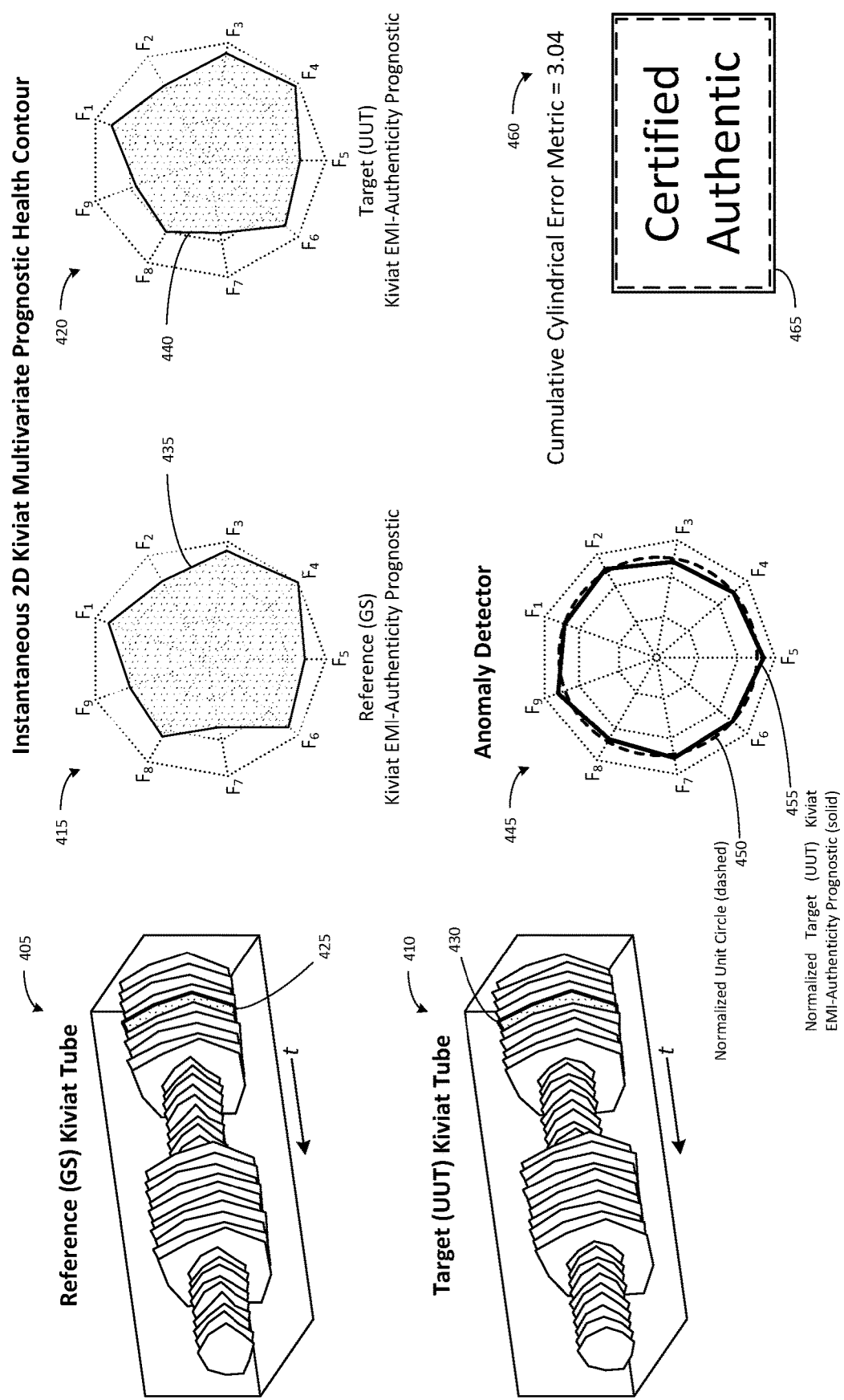
FIG. 4 illustrates one embodiment of a graphical user interface associated with confirming to a user that a target device is genuine using EMI frequency kiviat tubes.

FIG. 4 illustrates one embodiment of a graphical user interface (GUI) 400 associated with confirming to a user that a target device is genuine using EMI frequency kiviat tubes. In one embodiment, GUI 400 shows a kiviat tube analysis where the target device (unit under test) has all authentic components, and the target EMI-KT fingerprint exhibits only minor deviations from a perfect circle.

GUI 400 includes a 3D visualization of an example reference (golden system) kiviat tube 405 and a 3D visualization of an example target (unit under test) kiviat tube 410. GUI 400 also includes an instantaneous 2D kiviat multivariate prognostic health contour visualization that includes a 2D visualization of one example reference kiviat plot 415 (reference (golden sample) kiviat EMI-authenticity prognostic) from the example reference kiviat tube 405, and a 2D visualization of one example target kiviat plot 420 (target (unit under test) kiviat EMI-authenticity prognostic) from the example target kiviat tube 410. The example kiviat plots of the example kiviat tubes are configured to represent the power amplitude on N=9 frequencies F1, F2, F3, F4, F5, F6, F7, F8, and F9 at discrete observations along the time axis of the example kiviat tubes. The position of the example reference kiviat plot 415 within example reference kiviat tube 405 is shown by the bolded reference kiviat plot 425 at observation t=5. The position of the example target kiviat plot 420 within example target kiviat tube 410 is shown by the bolded target kiviat plot 430 at observation t=5. The power amplitude values at observation t=5 along each frequency axis of the example reference kiviat plot 415 are shown by the vertices of reference area 435 at the intersections with the axes of the example reference kiviat plot 415. The power amplitude values at observation t=5 along each frequency axis of the example target kiviat plot 420 are shown by the vertices of target area 440 at the intersections with the axes of the example reference kiviat plot 420.

In one embodiment, GUI 400 also includes an anomaly detector kiviat plot 445. The anomaly detector kiviat plot shows a normalized unit circle 450 shown by a dashed line, and a normalized target outline 455 of the target area 440 shown by a solid line. As discussed above with reference to process block 325, the axes of anomaly detector kiviat plot 445 are adjusted or normalized such that the power amplitude values along each axis of the example reference kiviat plot 415 (the vertices of reference area 435) fall on the intersection of the unit circle 450 and the respective axis. Thus, the target area 440 is normalized to unit circle 450 in anomaly detector kiviat plot 445 as shown by normalized target outline 455. Note that the normalized target outline 455 and the unit circle 450 are highly congruent, indicating that the target and reference devices behave similarly for all frequencies at the same time observation in the test sequence. The area (in magnitude or absolute value) of the annular residual between a unit circle for each observation and a normalized target outline for each observation is calculated. The areas of the annular residuals are integrated from the initial observation (t=0) to the current observation (in the example shown in the figure, at 425, 430, the current observation is t=5) to determine the Cumulative Cylindrical Error Metric (CCEM) 460 at the current observation. The CCEM will grow cumulatively as the observations progress from observation t=0 to observation t=M for a pair of reference and target kiviat tubes of M total observations. The final CCEM at t=M is the area of the annular residuals integrated over all M observations. In one embodiment, while the CCEM continues to satisfy a threshold test indicating that the example reference kiviat tube 405 and example target kiviat tube 410 are for target devices with similar configurations, GUI 400 receives a signal to display an authenticity certification 465. In one embodiment, continued display of authenticity certification 465 through the final CCEM at observation t=M indicates that the target device is certified to be authentic, genuine, or otherwise has no counterfeit components. In one embodiment, authenticity certification 465 is not presented on GUI 400 until observation t=M is reached. In one embodiment, authenticity certification 465 may take the form of a large, green icon that indicates that the target device is "genuine," "authentic," "verified," or other language indicating that the target EMI-KT fingerprint for the target device matches the reference EMI-KT fingerprint for a genuine article.

In one embodiment, GUI 400 is configured to show the reference kiviat plot and target kiviat plot for each observation position along the kiviat tubes in an animated sequence in response to a user command to show the animated sequence. The GUI 400 displays each pair of reference kiviat plot and target kiviat plot in turn as the observation progresses from observation t=0 to observation t=M for a pair of reference and target kiviat tubes of M total observations. As each pair of reference kiviat plot and target kiviat plot is displayed in turn, the respective position of the kiviat plots within the reference and target kiviat tubes are highlighted, as shown with reference to bolded kiviat plots 425 and 430. The highlighting may be achieved for example by a change of color, a change of transparency, a change of size or shape, a change of border thickness, or a change of border line. In one embodiment, the GUI 400 is configured to step forward or backward through the observations in response to user commands to step forwards or backwards. In response to the respective step forwards or step backwards commands, the GUI 400 (i) displays the subsequent or previous pair of reference and target kiviat plots in the health contour visualization, and (ii) removes the highlight from the current observation in the example kiviat tubes and highlights the position of the subsequent or previous pair of reference and target kiviat plots. In one embodiment, the GUI 400 is configured to jump directly to a selected observation within the example kiviat tubes in response to a user command to select that observation. In response to the jump command, the pair of reference and target kiviat plots at the selected observation are displayed, and the highlight in the kiviat tubes is transferred to the selected pair. In one embodiment, the user inputs may include keystroke or mouse click inputs.

Figure 5:
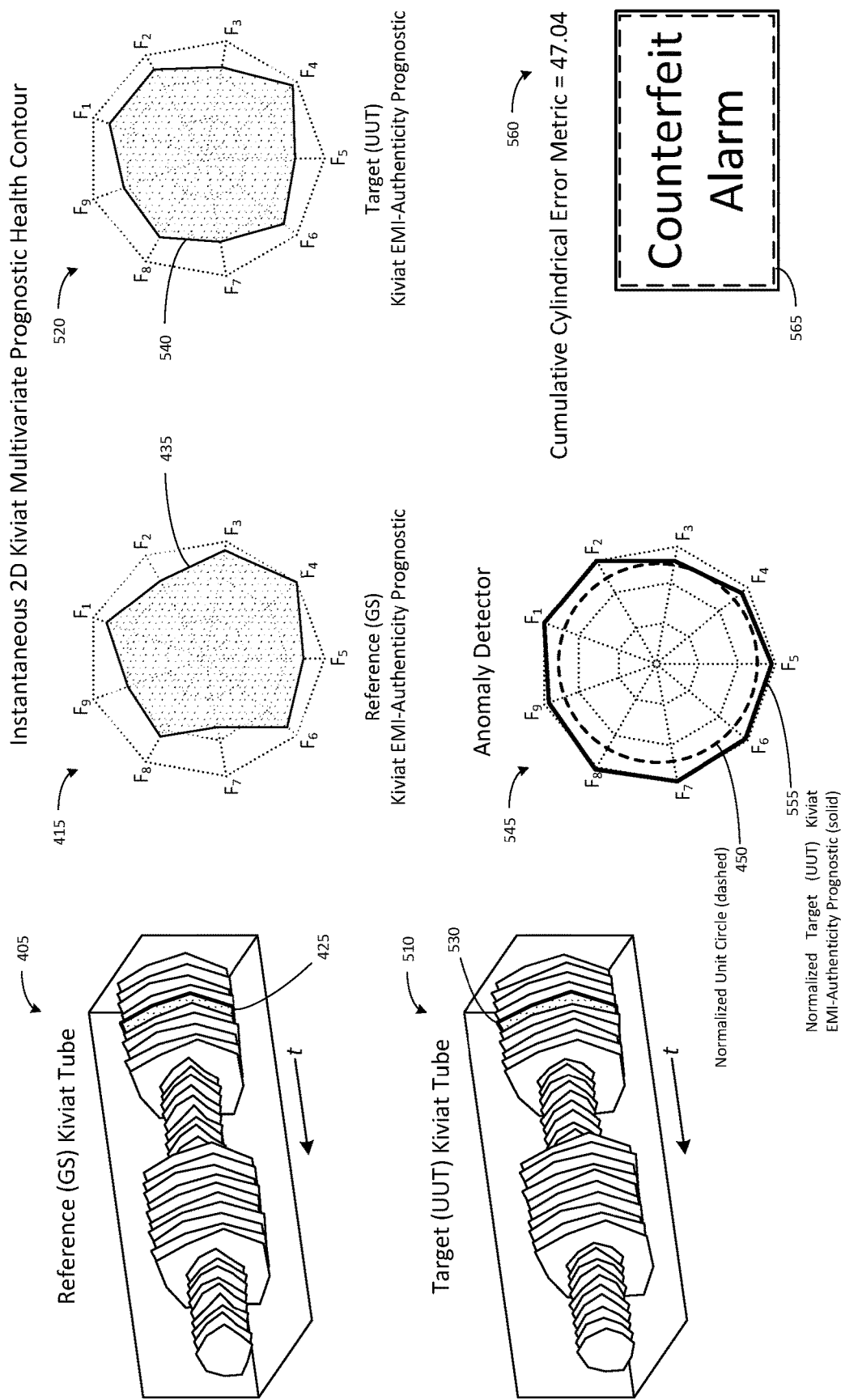
FIG. 5 illustrates one embodiment of a graphical user interface associated with alerting a user to counterfeit components in a target device using EMI frequency kiviat tubes.

FIG. 5 illustrates one embodiment of a graphical user interface 500 associated with alerting a user to counterfeit components in a target device using EMI frequency kiviat tubes. In one embodiment, GUI 500 shows a kiviat tube analysis where the target device (unit under test) has at least one counterfeit component. Here, the target EMI-KT fingerprint exhibits significant deviations from a perfect circle.

GUI 500 includes 3D visualization of an example reference (golden system) kiviat tube 405 and a 3D visualization of an example suspicious target (unit under test) kiviat tube 510 for a potentially counterfeit target device. GUI 500 also includes an instantaneous 2D kiviat multivariate prognostic health contour visualization that includes a 2D visualization of the example reference kiviat plot 415 (reference (golden sample) kiviat EMI-authenticity prognostic) from the example reference kiviat tube 405, and a 2D visualization of one example suspicious target kiviat plot 520 (target (unit under test) kiviat EMI-authenticity prognostic) from the example suspicious target kiviat tube 510. The position of the example suspicious target kiviat plot 520 within example suspicious target kiviat tube 510 is shown by the bolded target kiviat plot 530 at observation t=5. The power amplitude values at observation t=5 along each frequency axis of the example suspicious target kiviat plot 520 are shown by the vertices of target area 440 at the intersections with the axes of the example reference kiviat plot 520.

In one embodiment, GUI 500 also includes an anomaly detector kiviat plot 545. The anomaly detector kiviat plot shows a normalized unit circle 450 shown by a dashed line, and a normalized suspicious target outline 555 of the target area 540 shown by a solid line. As discussed above with reference to anomaly detector kiviat plot 445 and process block 325, the suspicious target area 540 is normalized to unit circle 450 in anomaly detector kiviat plot 545 as shown by normalized target outline 555. Note that the normalized suspicious target outline 555 and the unit circle 450 are divergent, indicating that the target and reference devices behave differently at the same time observation in the test sequence. The areas of the annular residuals between the unit circle and normalized suspicious target outline for each observation are integrated from the initial observation (t=0) to the current observation (as shown in the figure, t=5) to determine the Cumulative Cylindrical Error Metric (CCEM) 560 at the current observation. The CCEM will grow cumulatively as the observations progress from observation t=0 to observation t=M for a pair of reference and target kiviat tubes of M total observations. The final CCEM at t=M is the area of the annular residuals integrated over all M observations. In one embodiment, once the CCEM fails to satisfy a threshold test indicating that the example reference kiviat tube 405 and example suspicious target kiviat tube 510 are for target devices with dissimilar configurations, GUI 500 receives a signal to display a counterfeit alarm 565. In one embodiment, display of counterfeit alarm 565 at any time before the final CCEM at observation t=M indicates that the target device is a potential counterfeit device suspected of having one or more counterfeit components. In one embodiment, counterfeit alarm 565 is not presented on GUI 500 until observation t=M is reached. In one embodiment, counterfeit alarm 565 may take the form of a large, red icon, perhaps shaped like an octagon to suggest the form of a stop sign, that indicates that the target device is "counterfeit," "suspicious," "not verified," or other language indicating that the target EMI-KT fingerprint for the target device does not match the reference EMI-KT fingerprint for a genuine article.

Thus, a display device (such as display 160) may be configured to present an icon that indicates that the target device is (i) genuine in response to the signal indicating a counterfeit status of genuine, and (ii) suspected counterfeit in response to the signal indicating a counterfeit status of suspected counterfeit.

—Example Method with Display—

Figure 6:
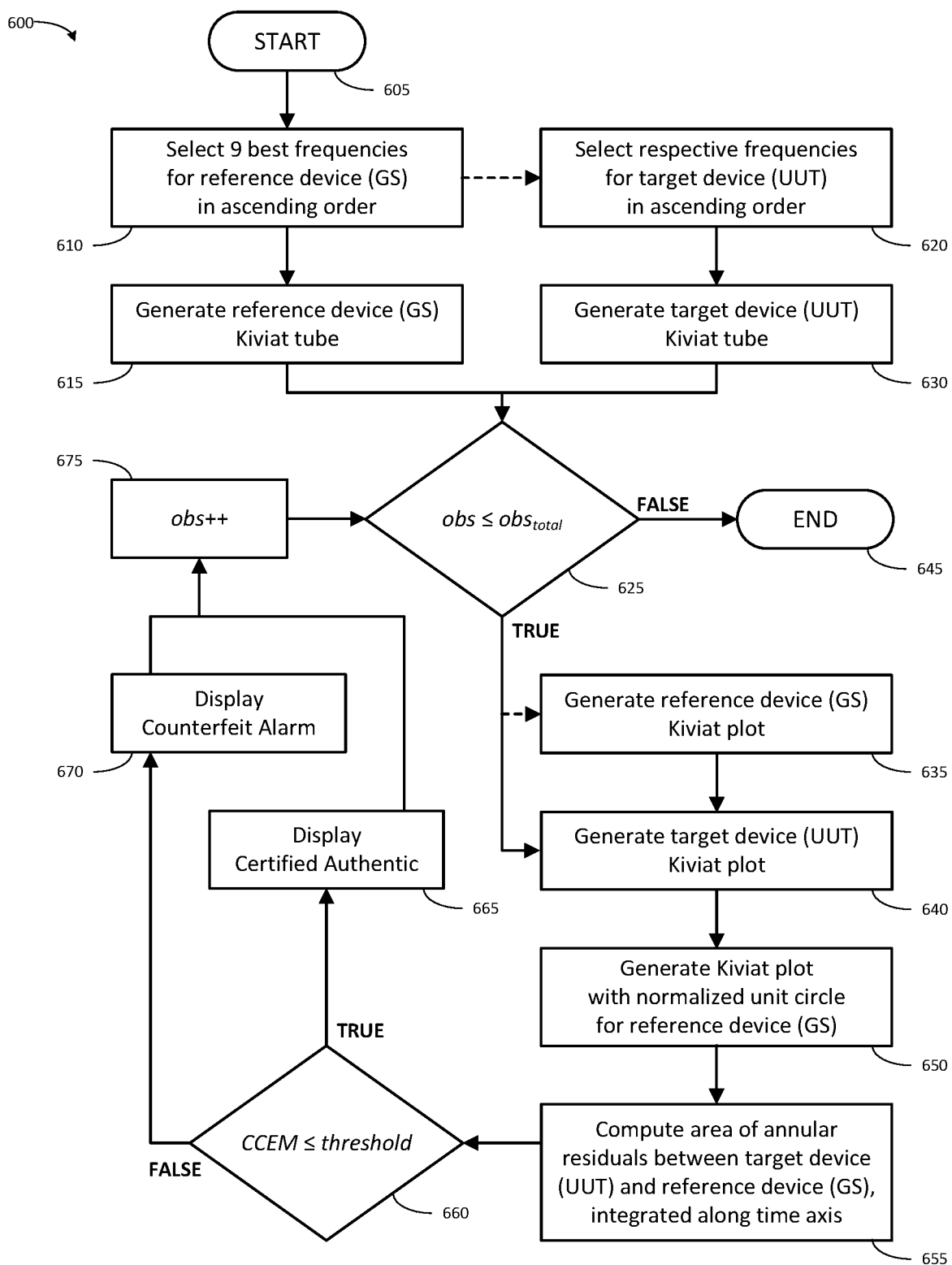
FIG. 6 illustrates one embodiment of a method associated with display of kiviat tube based EMI fingerprinting for counterfeit device detection.

FIG. 6 illustrates one embodiment of a method 600 associated with display of kiviat tube based EMI fingerprinting for counterfeit device detection. The method 600 is a method for displaying a counterfeit status of a target device (for example, a status of being genuine, or a status of containing at least one counterfeit component).

The method 600 may be initiated based on various triggers, such as receiving a signal over a network or parsing stored data indicating that (i) a user (or administrator) of EMI fingerprint counterfeit scanner 100 has initiated method 600, for example by providing a signal indicating initiation of a scan using the EMI fingerprint counterfeit scanner 100, (ii) that that method 600 is scheduled to be initiated at defined times or time intervals, (iii) that a target device is in place and ready to be scanned, or (iv) some other trigger indicating that method 600 should begin. The method 600 initiates at START block 605 in response to determining that a parsed signal received or stored data retrieved indicates that the method 600 should begin. Processing continues to process block 610.

At process block 610, the system selects the nine best frequencies for a reference device (golden sample) in ascending order. In one embodiment, selection of the 9 best frequencies is performed by the system as shown and described with reference to process block 310 of FIG. 3. Processing at process block 610 then completes, and processing continues to process block 615. Additionally, processing may continue to process block 620.

At process block 615, the system generates a reference device (golden sample) kiviat tube. In one embodiment, the generation of the reference device kiviat tube is performed by the system as shown and described with reference to process block 310, or in a similar manner to that shown and described for a target EMI-KT fingerprint with reference to process blocks 315 and 320. Processing at process block 615 then completes, and processing continues to decision block 625.

At process block 620, the system selects the respective frequencies for a target device (unit under test) in ascending order. In one embodiment, the system selects the same frequencies as selected for the reference device at process block 610. In one embodiment, the system parses the reference (golden sample) kiviat tube (reference EMI-KT fingerprint) to extract the frequencies. Processing at process block 620 then completes, and processing continues to process block 630.

At process block 630, the system generates a target device (unit under test) kiviat tube. In one embodiment, the generation of the target device kiviat tube is performed by the system in a similar manner to that shown and described for a reference EMI-KT fingerprint with reference to process block 310, or as shown and described with reference to process blocks 315 and 320. Processing at process block 630 then completes, and processing continues to decision block 625.

At decision block 625, the system determines whether the current observation is less than or equal to the total number of observations for the kiviat tubes. In one embodiment, a loop for a comparison and GUI display of the target and reference EMI-KT fingerprints is initiated. The current observation is initialized to the value of the first observation in the kiviat tube for the test sequence (applicable to both reference and target kiviat tubes). The initial value is commonly 0, or 1, although other values may be appropriate. The total number of observations in the kiviat tube (applicable to both reference and target kiviat tubes) is identified, for example by parsing either kiviat tube to extract the total number of observations. If the current observation is less or equal to than the total number of observations, (TRUE), processing at decision block 625 completes and processing continues (i) to process block 635 if a reference device (golden sample) kiviat plot for this observation has not yet been generated, and (ii) directly to process block 640 if the reference device kiviat plot for this observation has been generated. If the current observation is greater than the total number of observations, (FALSE), processing at decision block 625 completes and processing continues to END block 645.

At process block 635, the system generates a reference device (golden system) kiviat plot. In one embodiment, the system retrieves a tuple describing the reference kiviat plot for the current observation from a data structure in memory. The system parses the tuple to extract the power amplitude values of the plot for each frequency. The system generates a kiviat plot displaying the extracted power amplitude values on their respective axes. The system stores the generated kiviat plot in memory and/or generates instructions to cause display 165 to show the generated kiviat plot in a GUI such as GUI 400. In one embodiment, process block 635 may be bypassed if the reference device kiviat plot is previously generated and stored in memory for immediate retrieval. Processing at process block 635 then completes, and processing continues to process block 640.

At process block 640, the system generates a target device (unit under test) kiviat plot. In one embodiment, the system retrieves a tuple describing the target kiviat plot for the current observation from a data structure in memory. The system parses the tuple to extract the power amplitude values of the plot for each frequency. The system generates a kiviat plot displaying the extracted power amplitude values on their respective axes. The system stores the generated kiviat plot in memory and/or generates instructions to cause display 165 to show the generated kiviat plot in a GUI such as GUI 400. Processing at process block 640 then completes, and processing continues to process block 650.

At process block 650, the system generates a kiviat plot with a normalized circle for the reference device (golden sample). In one embodiment, the system retrieves a tuple describing the reference kiviat plot for the current observation from a data structure in memory. The system parses the tuple to extract the reference power amplitude values of the plot for each frequency. The system calculates adjustments to a magnitude of each axis of a kiviat plot to allow a unit circle for the current observation to intersect each axis at the extracted reference power amplitude values along the value's respective axis. The system plots the unit circle on the adjusted (normalized) kiviat plot. The system retrieves a tuple describing the target kiviat plot for the current observation from a data structure in memory. The system parses the tuple to extract the target power amplitude values of the plot for each frequency. The system plots the target power amplitude values on the adjusted (normalized) kiviat plot to form a normalized target kiviat plot for the current observation. The system stores the normalized target kiviat plot with unit circle in memory and/or generates instructions to cause display 165 to show the normalized target kiviat plot with unit circle in a GUI such as GUI 400. Processing at process block 650 then completes, and processing continues to process block 655.

At process block 655, the system computes an area of annular residuals between the target device (unit under test) and reference device (golden sample), integrated along a time axis. In one embodiment, the system calculates the magnitude (absolute value) of the area of annular residuals between the unit circle for the current observation and the normalized target kiviat plot for the current observation. To integrate the area along the time axis, the system adds the calculated area for the current observation to the cumulative sum of the calculated areas for all prior observations to form the cumulative cylindrical error metric (CCEM) for the current observation. The system stores the CCEM in memory and/or generates instructions to cause display 165 to show the CCEM in a GUI such as GUI 400. Processing at process block 655 then completes, and processing continues to decision block 660.

At process block 660, the system determines if the cumulative cylindrical error metric (CCEM) is less than or equal to a threshold. In one embodiment, the determination of whether the CCEM for the current observation satisfies the threshold test is performed as shown and described with reference to process block 325. The results of the threshold test may be stored in memory by the system and/or used by the system to generate a signal indicating a counterfeit status of the target device. If the CCEM is less than or equal to the threshold (TRUE), processing at decision block 660 completes, and processing continues to process block 665. If the CCEM is greater than the threshold (FALSE), processing at decision block 660 completes, and processing continues to process block 670.

At process block 665, the system causes a graphical user interface to display an indication that the target device (unit under test) is certified authentic. In one embodiment, the system generates the indication and performs the display of the indication as shown and described with reference to process block 330. Processing at process block 665 then completes, and processing continues to process block 675.

At process block 670, the system causes the graphical user interface to display an alarm that the target device (unit under test) is potentially counterfeit. In one embodiment, the system generates the indication and performs the display of the indication as shown and described with reference to process block 330. Processing at process block 670 then completes, and processing continues to process block 675.

At process block 675, the system increments the observation count. In one embodiment, the system adds one to the current observation count, and stores the incremented observation count in memory for later reference. Note that observations may be evenly spaced, and may be, but need not be, standard time increments, such as seconds, milliseconds, or other units. Processing at process block 675 then completes, and processing returns to decision block 625.

Processing repeats from decision block 625 through process block 675 while the current observation count is less than or equal to the total observation count (decision block 625 TRUE) until the current observation count is incremented to exceed the total observation count (decision block 625 FALSE). At this point, processing continues to end block 645, where processing ends.

Each of the items generated by method 600 may be stored in memory for later retrieval and display in a GUI, such as GUI 400. The generated items may be stored in local data storage 150, or remotely in data store 235. These items may be retrieved for display in response to inputs into a GUI, such as shown and described with reference to FIGS. 4 and 5.

—Selected Advantages—

In one embodiment, the methods and systems described herein provide a highly effective detection tool for counterfeit devices. When properly employed, the methods and systems described herein are able to detect the presence of counterfeit electronic components in a device nearly 100% of the time. Further, in one embodiment, the tool is easy to use for non-expert personnel. The tool enables the detection and identification of exact counterfeits in an autonomous fashion so that personnel (i) involved in acceptance testing of components from the supply chain, and (ii) involved in examining shipped systems at ports of entry and other national and international boundaries can quickly identify devices that contain internal counterfeit components or certify devices as having all authentic components. These personnel are not required to be expert in EMI radiation, data science, machine learning, or counterfeit detection techniques in order to receive these advantages from use of the systems and methods described herein.

In one embodiment, the methods and systems described herein further enable law enforcement to identify the exact makes, models, and/or implementations of counterfeit devices with a unique EMI-KT fingerprint to allow the counterfeit devices to be traced through supply chain routes to the source. The systems and methods described herein enable accurate and incontrovertible identification of internal counterfeit components in power devices, with persistent and fool-proof identification of the exact supplier-specific pedigree of the counterfeits. The correlation of this data by the EMI-KT fingerprint enables data analysis to accurately (i) assess the prevalence of a counterfeit device in the supply chain (the size of a specific counterfeit problem), and (ii) trace the pedigree of counterfeit devices and components back through the supply chain to identify and shut down the supplier of counterfeit components.

The advantages described herein are achieved due to the methods and systems described herein, for example, due to the increased sensitivity offered by the EMI-KT fingerprint. The methods and system described herein were not previously performed by and could not have been performed by humans and thus are not computerizations of existing, human-implemented processes.

—Cloud or Enterprise Embodiments—

In one embodiment, the cloud application infrastructure 225 and/or other systems shown and described herein are a computing/data processing system including an application or collection of distributed applications for enterprise organizations. The applications and data processing system may be configured to operate with or be implemented as a cloud-based networking system, a software as a service (SaaS) architecture, or other type of networked computing solution. In one embodiment the cloud computing system is a server-side system that provides one or more of the functions disclosed herein and that is accessible by many users through EMI fingerprint counterfeit scanner 100 or other client computing devices communicating with the cloud computing system (functioning as the server) over a computer network.

—Computing Device Embodiment—

Figure 7:
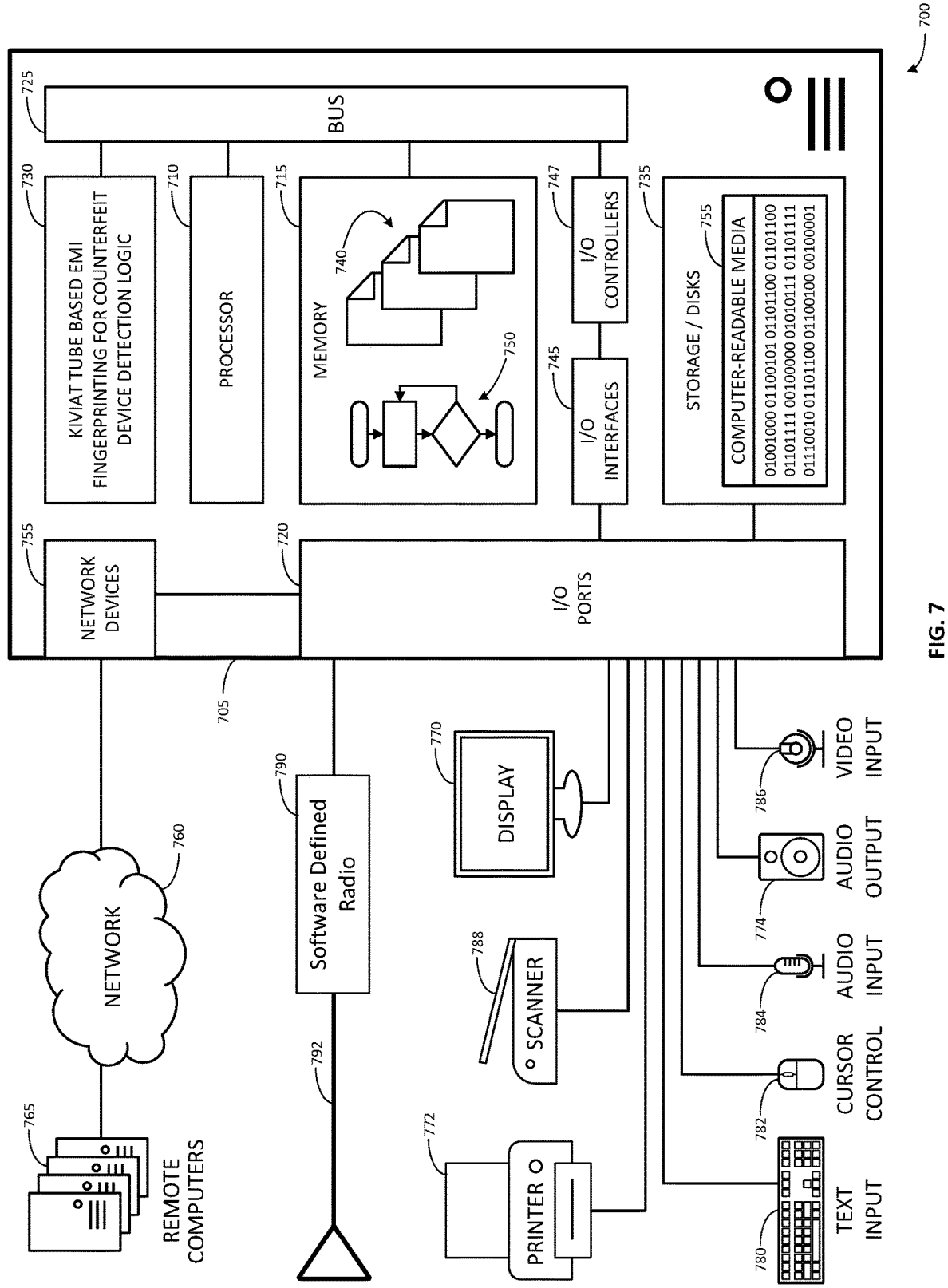
FIG. 7 illustrates an embodiment of a computing system configured with the example systems, methods, and/or special purpose equipment disclosed herein.

FIG. 7 illustrates an example computing device 700 that is configured and/or programmed with one or more of the example systems and methods described herein, and/or equivalents. The example computing device may be a computer 705 that includes a processor 710, a memory 715, and input/output ports 720 operably connected by a bus 725. In one example, the computer 705 may include kiviat tube based EMI fingerprinting for counterfeit device detection logic 730 configured to facilitate kiviat tube based EMI fingerprinting for counterfeit device detection similar to logic and systems shown in FIGS. 1 through 6. In different examples, the logic 730 may be implemented in hardware, a non-transitory computer-readable medium with stored instructions, firmware, and/or combinations thereof. While the logic 730 is illustrated as a hardware component attached to the bus 725, it is to be appreciated that in other embodiments, the logic 730 could be implemented in the processor 710, stored in memory 715, or stored in disk 735.

In one embodiment, logic 730 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed for kiviat tube based EMI fingerprinting for counterfeit device detection. The means may also be implemented as stored computer executable instructions that are presented to computer 705 as data 740 that are temporarily stored in memory 715 and then executed by processor 710.

Logic 730 may also provide means (e.g., hardware, non-transitory computer-readable medium that stores executable instructions, firmware) for performing kiviat tube based EMI fingerprinting for counterfeit device detection.

Generally describing an example configuration of the computer 705, the processor 710 may be a variety of various processors including dual microprocessor and other multi-processor architectures. A memory 715 may include volatile memory and/or non-volatile memory. Non-volatile memory may include, for example, ROM, PROM, and so on. Volatile memory may include, for example, RAM, SRAM, DRAM, and so on.

A storage disk 735 may be operably connected to the computer 700 via, for example, an input/output (I/O) interface (for example, card, device) 745 and an input/output port 720. The disk 735 may be, for example, a magnetic disk drive, a solid-state disk drive, a floppy disk drive, a tape drive, a Zip drive, a flash memory card, a memory stick, and so on. Furthermore, the disk 735 may be a CD-ROM drive, a CD-R drive, a CD-RW drive, a DVD ROM, and so on. The memory 715 can store a process 750 and/or a data 740, for example. The disk 735 and/or the memory 715 can store an operating system that controls and allocates resources of the computer 705.

The computer 705 may interact with input/output (I/O) devices via the I/O interfaces 745 and the input/output ports 720. Input/output devices may be, for example, a keyboard 780, a microphone 784, a pointing and selection device 782, cameras 786, video cards, displays 770, scanners 788, printers 772, speakers 774, the disk 735, the network devices 755, and so on. The input/output ports 720 may include, for example, serial ports, parallel ports, and USB ports. The input/output devices may include a software defined radio 790 and associated antenna 792.

The computer 705 can operate in a network environment and thus may be connected to the network devices 755 via the I/O interfaces 745, and/or the I/O ports 720. Through the network devices 755, the computer 705 may interact with a network 760. Through the network 760, the computer 705 may be logically connected to remote computers 765. Networks with which the computer 705 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
XML: extensible markup language.
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A method for detecting a counterfeit status of a target device, the method comprising:
    applying a power test sequence to the target device;
    obtaining a plurality of electromagnetic interference (EMI) signals emitted by the target device while undergoing the power test sequence;
    creating a target kiviat tube EMI fingerprint based on at least the plurality of EMI signals obtained;
    comparing the target kiviat tube EMI fingerprint to a reference kiviat tube EMI fingerprint of a reference device to determine whether the target device and the reference device are of the same type; and
    generating a signal to indicate a counterfeit status of the target device based at least in part on a result of the comparison.

2. The method of claim 1, wherein creating the target kiviat tube EMI fingerprint further comprises:
    creating a sequence of target kiviat plots from an amplitude of the plurality of EMI signals at each of a set of frequencies at observations over the power test sequence to create the target kiviat tube EMI fingerprint; and
    generating an estimate of the amplitude at each of the set of frequencies by a state estimation model trained on the reference kiviat tube EMI fingerprint, wherein the target kiviat plot is a kiviat plot of the estimate.

3. The method of claim 2, wherein the comparison further comprises normalizing each axis of each target kiviat plot to a unit circle passing through a value plotted on a corresponding axis of a corresponding reference kiviat plot at the same observation in the reference kiviat tube EMI fingerprint.

4. The method of claim 1, wherein the power test sequence is applied as the same power test sequence applied to the reference device for creating the reference kiviat tube EMI fingerprint of the reference device.

5. The method of claim 1, wherein the comparison further comprises generating an error metric from annular residuals between a target kiviat plot and a reference kiviat plot at a same observation in the reference kiviat tube EMI fingerprint, wherein the error metric is a cumulative area of annular residual between the reference kiviat plots and target kiviat plots over all observations.

6. The method of claim 1, wherein the reference device is a genuine device of a particular type, wherein the method further comprising,
    (i) in response to determining that the target device and reference device are of the same type based on matching kiviat tube EMI fingerprints, generating the signal of the counterfeit status to indicate that the target device is genuine, and
    (ii) in response to determining that the target device and reference device are not of the same type based on not matching kiviat tube EMI fingerprints, generating the signal of the counterfeit status to indicate that the target device is a suspected counterfeit.

7. The method of claim 6, further comprising, in response to the signal that the target device is the suspected counterfeit:
transmitting the target kiviat EMI fingerprint to a counterfeit analysis system;
transmitting supply chain information about the target device to the counterfeit analysis system; and
receiving additional information about a suspected counterfeit configuration from a counterfeit analysis system, wherein the additional information includes one or more of:
(i) a confirmation that the suspected counterfeit is a counterfeit of a known type,
(ii) prevalence information describing how common devices with the suspected counterfeit configuration are,
(iii) source information describing an origin of devices with the suspected counterfeit configuration, or
(iv) supply chain information describing how the target device may have entered the supply chain.

8. The method of claim 1, further comprising retrieving the reference kiviat tube EMI fingerprint for the reference device from a library database.

9. The method of claim 1, further comprising displaying a first visualization of the reference kiviat tube and a second visualization of the target kiviat tube along with one of a counterfeit alarm or an authenticity certification on a graphical user interface.

10. A non-transitory computer-readable medium storing computer-executable instructions that when executed by at least a processor of a computer cause the computer to:
apply a power test sequence to a target device;
obtain a plurality of electromagnetic interference (EMI) signals emitted by the target device while undergoing the power test sequence;
create a target kiviat tube EMI fingerprint based on at least the plurality of EMI signals obtained;
compare the target kiviat tube EMI fingerprint to a reference kiviat tube EMI fingerprint from a reference device based on the power test sequence to determine whether the target device and the reference device are of the same type; and
generate a signal to indicate a counterfeit status of the target device based at least in part on a result of the comparison.

11. The non-transitory computer readable medium of claim 10, wherein the instructions that cause the computer to create the target kiviat tube EMI fingerprint further comprise instructions that cause the computer to
create a sequence of target kiviat plots from an amplitude of the plurality of EMI signals at each of a set of frequencies at observations over the power test sequence to create the target kiviat tube EMI fingerprint; and
generate an estimate of the amplitude at each of the set of frequencies by a state estimation model trained on the reference kiviat tube EMI fingerprint, wherein the target kiviat plot is a kiviat plot of the estimate.

12. The non-transitory computer readable medium of claim 11, wherein the instructions that cause the computer to compare the target kiviat tube EMI fingerprint further comprise instructions that cause the computer to normalize each axis of each target kiviat plot to a unit circle passing through a value plotted on a corresponding axis of a corresponding reference kiviat plot at the same observation in the reference kiviat tube EMI fingerprint.

13. The non-transitory computer readable medium of claim 10, wherein the instructions that cause the computer to compare the target kiviat tube EMI fingerprint further comprise instructions that cause the computer to generate a cumulative cylindrical error metric across a plurality of observations of the target and reference kiviat tube EMI fingerprint.

14. The non-transitory computer readable medium of claim 10, further comprising instructions that cause the computer to transmit the target kiviat EMI fingerprint to a counterfeit analysis system in response to the signal that the counterfeit status of the target device is a suspected counterfeit.

15. The non-transitory computer readable medium of claim 10, wherein the reference device is a device with at least one electronic component and the target device is a similar type of device as the reference device.

16. A computing system, comprising:
a processor;
a memory operably connected to the processor;
a radio operably connected to the processor and memory;
a non-transitory computer-readable medium operably connected to the processor and memory and storing computer-executable instructions that when executed by at least the processor cause the computing system to:
apply a power test sequence to a target device;
obtain, through the radio, a plurality of electromagnetic interference (EMI) signals emitted by the target device while undergoing the power test sequence;
create a target kiviat tube EMI fingerprint based on at least the plurality of EMI signals obtained;
compare the target kiviat tube EMI fingerprint to a reference kiviat tube EMI fingerprint from a reference device to determine whether the target device and the reference device are of the same type; and
generate a signal to indicate a counterfeit status based at least in part on a result of the comparison.

17. The computing system of claim 16, further comprising a display device configured to present an icon that indicates that the target device is (i) genuine in response to the signal indicating a counterfeit status of genuine, and (ii) suspected counterfeit in response to the signal indicating a counterfeit status of suspected counterfeit.

18. The computing system of claim 16, wherein the computer-executable instructions further cause the computing system to: generate a cumulative cylindrical error metric across a plurality of observations of the target and reference kiviat tube EMI fingerprint.

19. The method of claim 1, wherein comparing the target kiviat tube EMI fingerprint to the reference kiviat tube EMI fingerprint of the reference device is based on annular residuals between the reference kiviat plots and target kiviat plots over a plurality of observations of the target and reference kiviat tube EMI fingerprint.

20. The method of claim 1, wherein comparing the target kiviat tube EMI fingerprint to the reference kiviat tube EMI fingerprint of the reference device is based on a cumulative area of annular residuals between the reference kiviat plots and target kiviat plots over a plurality of observations of the target and reference kiviat tube EMI fingerprint.

* * * * *